United States Patent
Ueda

(10) Patent No.: US 6,894,754 B2
(45) Date of Patent: May 17, 2005

(54) SUBSTRATE WITH A FLATTENING FILM, DISPLAY SUBSTRATE, AND METHOD OF MANUFACTURING THE SUBSTRATES

(75) Inventor: Tohru Ueda, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 50 days.

(21) Appl. No.: 10/370,461

(22) Filed: Feb. 24, 2003

(65) Prior Publication Data

US 2003/0184697 A1 Oct. 2, 2003

(30) Foreign Application Priority Data

Mar. 28, 2002 (JP) .................................... 2002-092365

(51) Int. Cl.⁷ ................................................. G02F 1/13
(52) U.S. Cl. ................................ 349/139; 349/143
(58) Field of Search .................... 349/113, 43, 139, 349/143

(56) References Cited

U.S. PATENT DOCUMENTS

| 5,990,988 A | * 11/1999 | Hanihara et al. ............. 349/48 |
| 6,261,883 B1 | 7/2001 | Koubuchi et al. |
| 6,441,456 B1 | 8/2002 | Konishi et al. |
| 6,734,924 B2 | * 5/2004 | Hirakata et al. .............. 349/39 |

FOREIGN PATENT DOCUMENTS

| JP | 2001-242443 | 9/2001 |
| TW | 436999 | 5/2001 |

OTHER PUBLICATIONS

Taiwanese Office Action mailed Jun. 8, 2004, (w/English translation thereof).

* cited by examiner

Primary Examiner—James A. Dudek
(74) Attorney, Agent, or Firm—Nixon & Vanderhye P.C.

(57) ABSTRACT

The invention involves: the forming of a dummy pattern for planarization between convex portions (for example, between lead electrodes and a signal wire pattern) of irregularities caused by a patterned layer on a surface on which at least one interlayer insulating film is formed, so as to be separated by a predetermined distance from the convex portions; the forming of interlayer insulating films 7a–7d so as to fill up gaps between the dummy pattern and the convex portions; and the planarizing of a surface. Thereby, the invention is capable of relaxing requirements on uniformity in the thickness of the film to be polished and the thickness of the polished portion.

43 Claims, 14 Drawing Sheets

SUBSTRATE WITH A FLATTENING FILM, DISPLAY SUBSTRATE, AND METHOD OF MANUFACTURING THE SUBSTRATES

FIELD OF THE INVENTION

The present invention relates to a substrate with a planarization film, a display substrate, and a method of manufacturing the substrates.

BACKGROUND OF THE INVENTION

Liquid crystal displays and like flat-panel displays have found use in a wide range of applications due to their thinness, low power consumption, and other advantages. Besides, in recent years, there are increasing demands for liquid crystal projectors as high-definition displays used in presentation, home theaters, and other situations. In many such projectors, the liquid crystal display is used as a light bulb.

A typical liquid crystal display has liquid crystal sandwiched between an active matrix substrate and an opposite substrate. On the active matrix substrate are there provided signal lines and scan lines crossing each other, as well as pixel electrodes and switching devices, etc. at the respective intersections of the signal and scan lines to control the writing of a signal to the pixel electrodes. On the opposite substrate is there formed an opposite electrode which is commonly shared among all the pixels. To improve the aperture ratio of the liquid crystal display, an interlayer insulating film is provided to cover the plane on which the signal and scan lines are formed, and the pixel electrodes are formed on that interlayer insulating film. The structure allows the pixel electrodes to overlap the signal and scan lines and cover a large area, thereby increasing the aperture ratio. The switching device is in many cases a TFT (thin film transistor).

The TFT leaks current upon light exposure, which is a unique disadvantage to the TFT. In liquid crystal displays, the photo-induced leak current results in poor contrast and increased crosstalk which in turn cause poor display quality. The problems are particularly serious with liquid crystal displays in liquid crystal projectors in which the display is used under intense light.

To solve the problems, in other words, to restrain the photoleak current, in conventional structures, a light-shield film or layer made of a metal or other material is provided at a level above the TFTs and below pixel electrodes.

In such structures, wires, TFTs, and other components are formed below the light-shield film. In other words, the light-shield film is provided on an underlying surface which is irregular due to the wires, TFTs, etc. and is thin at slopes on the irregular surface. The light-shield film thus cannot exhibit its full light-shielding potential.

In the light-shield film structure, the pixel electrodes of course sit on irregularities due to the light-shield film on which the electrodes are deposited, as well as those irregularities due to wires, TFTs, etc. The pixel electrodes are topped by an alignment film which is subjected to alignment treatment so as to align the liquid crystal molecules in a predetermined direction. The existence of irregularities is however a hindrance for a proper alignment treatment to be carried out where the irregularities cause abrupt changes in surface level. The result is defective alignment of the liquid crystal. Another problem arises if those parts where alignment is defective are shielded against light to ensure a good contrast level: the aperture ratio, and hence brightness, drops dramatically, especially in liquid crystal displays for the liquid crystal projector with small pixels.

Various suggestions have been made about planarization structure to address these problems caused by underlying surface irregularities. Japanese Unexamined Patent Application, or Tokukai, 2001-242443 published on Sep. 7, 2001 is an example.

FIG. 13 shows a liquid crystal display disclosed in the Application. The liquid crystal display in FIG. 13 is one with planarized films (planarization films), a first planarization film 131 filling the surface irregularities due to thin film transistors, a second planarization film 130 filling the surface irregularities due to the light-shield film 109.

The first and second planarization films 130, 131 are fabricated by either planarizing the surface of a deposited insulating film by chemical mechanical polishing (CMP) or spin-coating the underlying surface flatly with an insulating material which is then baked (SOG).

Now, referring to FIG. 13, the following will briefly discuss a method of manufacturing the liquid crystal display disclosed in the Application. First, a film of polycrystalline silicon (Si) doped with phosphorous (P) and a tungustenic silicon (WSi) film are deposited in this order on a silicon dioxide glass substrate 113. The films are then patterned into a light-shield film 112.

Next, a silicon dioxide ($SiO_2$) interlayer insulating film 107b and a polycrystalline silicon film are deposited in this order covering the entire substrate surface by, for example, chemical vapor deposition (CVD). The latter film is patterned into a polycrystalline silicon film (polycrystalline Si film) 114.

Thereafter, a silicon dioxide ($SiO_2$) gate insulating film 117 is deposited covering the entire substrate surface by, for example, CVD. Subsequently, the films sequentially formed covering the entire substrate surface, for example, the P-doped polycrystalline Si film and the WSi film, are patterned into gate wires 116 and electrodes 115 which will be used for additional capacitance elements.

A $SiO_2$ interlayer insulating film 107a is then deposited covering the entire substrate surface by, for example, CVD. The interlayer insulating film 107a and the gate insulating film 117 are partly etched away where specified to form contact holes 111a.

Next, either a WSi film or an aluminum (Al) film and WSi film are deposited covering the entire substrate surface and patterned into lead electrodes 110 and signal wires 120.

Then, a $SiO_2$ interlayer insulating film (not shown) is deposited covering the entire substrate surface by, for example, atmospheric pressure CVD. Next, a silicon nitride (SiN) film (not shown) is deposited covering the entire substrate surface by, for example, plasma CVD and patterned.

Next, a $SiO_2$ film is deposited covering the entire substrate surface by, for example, plasma CVD using TEOS as a source gas. The film is polished by, for example, CMP to form the first planarization film 131. The Application discloses an example in which the film, 2500 nm thick prior to the polishing, is polished down to 2200 nm by CMP so that the film has a smooth surface. The CMP process is capable of reducing remaining surface steps to 0.5 $\mu$m or less and, depending on conditions, even to 0.1 $\mu$m or less.

Next, the first planarization film 131 and an interlayer insulating film (not shown) are partly etched away where specified to form contact holes 111b. A titanium (Ti) film is then deposited covering the entire substrate surface by, for example, for example, vapor deposition or sputtering and patterned into a electrically conductive light-shield film 109.

Next, the second planarization film 130 is formed on the light-shield film 109 with an intermediate film (not shown) intervening there between. The intermediate film is, for example, a SiO film made by plasma CVD using TEOS as a source gas. The second planarization film 130 is formed on that intermediate film by SOG. Alternatively, the second planarization film 130 may be formed by CMP.

Next, the second planarization film 130 is partly etched away where specified to form contact holes 111c. An ITO film of a for example, 70-nm thickness is then deposited covering the entire substrate surface and patterned into pixel electrodes 106. Thereafter, an alignment film 105 is formed on the pixel electrodes 106 and subjected to alignment treatment, which concludes the fabrication of an active matrix substrate 201.

An opposite substrate is fabricated by sequentially forming on the silicon dioxide glass 113 an alignment film 103 and an opposite electrode 102 of a transparent, electrically conductive film and subjecting the alignment film 103 to alignment treatment. The active matrix substrate 201 fabricated as above and the opposite substrate are combined so that the alignment films 105, 103 are located opposite each other. A liquid crystal layer 104 is sealed between the substrates, which concludes the fabrication of a liquid crystal display.

However, in a method disclosed in the Application for forming the first and second planarization films 131, 130 whereby CMP is used to polish films, deposited on irregular surfaces, which will become the first and second planarization films 131, 130 so that they have flat surfaces, the films which will be polished are thicker by far than films deposited in a film formation step and portions etched away in an etching step in ordinary manufacture of a liquid crystal display. Further, the portion polished and hence removed by CMP needs to be thicker than the steps on the underlying surface and hence thicker by far than films deposited in a film formation step and portions etched away in an etching step in ordinary manufacture of a liquid crystal display. Note that the thickness of that portion polished and removed by CMP will be referred to as the "polishing amount."

For example, as shown in FIGS. 14(a) to 14(d), to form the first planarization film 131 by CMP, the thickness of the SiO$_2$ film 140 to be polished and the thickness of the portion 141 polished and hence removed by CMP (polishing amount) need to be greater than X, or the depths of the steps on the underlying surface. In the case of the first planarization film 131, a specific example disclosed in the Application, the film 140 to be polished is 2500 nm in thickness, and the portion 141 polished and hence removed by CMP is 2200 nm in thickness.

A film is required that is far thicker than a film deposited in a film formation step and a film etched away in an etching step in ordinary manufacture of a liquid crystal display. In a film planarization process by CMP, the greater the depths X of the steps on the underlying surface, the thicker the film 140 to be polished and the portion 141 polished and hence removed by CMP.

In the manufacture of a liquid crystal display, there is a minimum level of uniformity in thickness required of polished films. In other words, variations in thickness of polished films need to be brought within a certain level. It is difficult to keep uniform the thickness of the polished film 140 if the film 140 before polishing is thick and the portion 141 which will be polished and hence removed is also thick for the foregoing reasons. A specific problem arises, in bringing the variations within a certain, restricted range: requirements are extremely high as to both the uniformity in thickness of the polished film 140 and the uniformity in thickness of the portion 141 polished and hence removed by CMP.

Assuming that the film 140 to be polished is 2500 nm in thickness and also that the portion 141 polished and hence removed by CMP is 2200 nm in thickness, an example will be given below showing an attempt to restrict the variations in thickness of the polished film 140 within ±15%, or 300±45 nm. For convenience in description, it is further assumed that the polished film 140 and the portion 141 polished and hence removed by CMP have the same variations in thickness: that is, the polished film 140 is 2500±Δ nm in thickness, and the portion 141 polished and hence removed by CMP is 2200±Δ nm in thickness. Under these conditions, $(\Delta^2+\Delta^2)^{1/2} \leq 45$ nm. Solving the inequality for Δ, we obtain $\Delta \leq 32$ nm.

Based on the value of Δ, the uniformity in thickness of the polished film 140 and the uniformity in thickness of the portion 141 polished and hence removed by CMP which restrict the variations in thickness of the polished film 140 within ±15% are obtained as in the following. The uniformity in thickness of the polished film 140 needs to be $(\Delta/2500) \cdot 100 = (32/2500) \cdot 100 = 1.3\%$. The uniformity in thickness of the portion 141 polished and hence removed by CMP needs to be $(\Delta/2200) \cdot 100 = (32/2200) \cdot 100 = 1.5\%$. In other words, in conventional methods, to restrict the variations in thickness of the polished film within ±15% (300±45 nm), both the uniformity in thickness of the polished film 140 and the uniformity in thickness of the portion 141 polished and hence removed by CMP need to be within 1.5%.

These requirements for excellent uniformity, i.e., such strict restrictions on the uniformity in the thickness of the polished film 140 and the uniformity in thickness of the portion 141 polished and hence removed by CMP that they fall within 1.5% as discussed here, presents a major obstacle in mass-producing liquid crystal displays.

Note that although these problems are unique to CMP and do not occur in SOG as a film planarization method, SOG has its own problems: the method is capable of smoothing out steps on the underlying surface only partially, not completely and not much reliable in a high intensity light environment, as when applied to projector panels, because of possible light-induced chemical reactions of an organic component leftover from the SOG process. The present invention does not consider SOG and instead focuses on the formation of a planarization film based on CMP which is free from these problems.

SUMMARY OF THE INVENTION

Conceived to address the foregoing conventional problems, the present invention has an object to suggest a substrate with a planarization film and a method of manufacturing such a substrate. In the substrate, the polished film and the polished portion are reduced in thickness and thereby only needs to meet less strict requirements as to uniformity in thickness of the polished film and that of the polished portion during the formation of a planarization film by CMP. The invention has another object to apply such a substrate and a method of manufacturing it in offering an easily mass-producible display and a method of manufacturing such a display.

To solve the foregoing problems, a substrate with a planarization film in accordance with the present invention is a substrate with a planarization film provided thereon to fill up irregularities caused by a pattern on a surface of the substrate, and characterized in that the substrate includes a dummy pattern for planarization formed between convex portions on the surface of the substrate so as to be separated by a predetermined distance from the convex portions, the planarization film being formed to fill up gaps between the dummy pattern and the convex portions.

According to the structure, the dummy pattern for planarization is formed between the convex portions on the substrate surface, separated by a predetermined distance from the convex portions. Therefore, although the dimension of the steps as such (the depth of the concave portions) caused by the irregularities on the substrate surface does not change, the dummy pattern fills up the concave portions between the convex portions. Only gaps which are sufficiently narrow compared to distances between the convex portions are formed on the surface on which the planarization film is formed, i.e., the underlying surface for the planarization film.

For example, when the planarization film is formed by CMP, the film which will be polished to become a planarization film is deposited by, for example, CVD. Forming the film to be polished in this manner produces, on the surface of that film, steps that are no smaller in size than the steps caused by the irregularities on the underlying surface. Accordingly, the thickness and polishing amount of the film to be polished needs to be greater than the steps on the underlying surface.

In contrast, as mentioned in the foregoing, according to the structure in accordance with the present invention, the irregularities on the underlying surface are sufficiently narrow gaps. Accordingly, the irregularities caused by the gaps on the surface of the film to be polished become shallower if the film to be polished is formed to fill in the gaps. In other words, the film to be polished is planarized to some extent by the dummy pattern.

This enables the film to be polished and the polishing amount to be made smaller than the dimension of the steps on the underlying surface, the requirements on uniformity in the thickness and polishing amount of the film to be polished to be relaxed, and mass-producibility of such substrates with a planarization film to be improved.

A method of manufacturing a substrate with a planarization film in accordance with the present invention is a method of manufacturing a substrate with a planarization film provided thereon to fill up irregularities caused by a pattern on a surface of the substrate, and characterized in that the method includes the steps of: forming a dummy pattern for planarization between convex portions on the surface of the substrate, so that the dummy pattern is separated by a predetermined distance from the convex portions, before forming the planarization film to fill up the irregularities caused by the pattern on the surface of the substrate; and forming the planarization film to fill up gaps between the dummy pattern and the convex portions.

According to the method, the dummy pattern for planarization is formed between the convex portions on the substrate surface, separated by a predetermined distance from the convex portions. Although the dimension of the steps as such (the depth of the concave portions) caused by the irregularities on the substrate surface does not change, the forming of such a dummy pattern fills up the concave portions between the convex portions. Gaps which are sufficiently narrow compared to distances between the convex portions are formed on the surface on which the planarization film is formed, i.e., the underlying surface for the planarization film. In this manner, by reducing the irregularities on the underlying surface to sufficiently narrow gaps, even if the film to be polished is formed to fill up the gaps, the irregularities caused by the gaps on the surface of the film to be polished become shallower. In other words, the film to be polished is planarized to some extent.

Thus, a method of manufacturing a substrate is offered which enables the film to be polished and the polishing amount of the film to be polished to be made smaller than the dimension of the steps on the underlying surface and the requirements on uniformity in the thickness and polishing amount of the film to be polished to be relaxed. Furthermore, the method of manufacturing a substrate improves mass-producibility of such substrates with a planarization film.

A display substrate in accordance with the present invention is a display substrate including pixel electrodes thereon, with a planarization film intervening there between to fill up irregularities caused by a pattern on an underlying surface for the pixel electrodes, and characterized in that the substrate includes a dummy pattern for planarization provided between convex portions on a surface on which the planarization film is formed and also on which the irregularities caused by the pattern exist, so that the dummy pattern is separated by a predetermined distance from the convex portions, the planarization film being formed to fill up gaps between the dummy pattern and the convex portions.

In those cases where the display is, for example, a liquid crystal display using liquid crystal, an alignment film is formed on the pixel electrodes to align liquid crystal molecules. If there are irregularities, and hence steps, on the surface on which the alignment film is formed in such cases, the alignment of the liquid crystal is disturbed there; it is therefore preferable to planarize the surface on which the pixel electrodes are formed. However, as described in the aforementioned Application, if the first and second planarization films are to be formed and planarized, the thickness and polishing amount of the film to be polished is greater by far than the thickness of the films deposited in a film formation step and portions etched away in an etching step in ordinary manufacture of a liquid crystal display.

According to the structure, the dummy pattern for planarization is formed between the convex portions on the substrate surface, separated by a predetermined distance from the convex portions. Accordingly, the dummy pattern fills up the concave portions between the convex portions. Only gaps which are sufficiently narrow compared to distances between the convex portions are formed on the surface on which the planarization film is formed, i.e., the underlying surface for the planarization film.

This enables the film to be polished and the polishing amount to be made smaller than the dimension of the steps on the underlying surface, the requirements on uniformity in the thickness and polishing amount of the film to be polished to be relaxed, and mass-producibility of such display substrates with a planarization film to be improved.

A method of manufacturing a display substrate in accordance with the present invention is a method of manufacturing a display substrate including pixel electrodes thereon, with a planarization film intervening there between to fill up irregularities caused by a pattern on an underlying surface for the pixel electrodes, and characterized in that the method includes the steps of: forming a dummy pattern for planarization between convex portions on a surface on which the planarization film is formed and also on which the irregularities caused by the pattern exist, so that the dummy pattern is separated by a predetermined distance from the convex portions, before forming the planarization film to fill up the irregularities caused by the pattern on an underlying surface for the pixel electrodes; and forming the planarization film to fill up gaps between the dummy pattern and the convex portions.

According to the method, the dummy pattern for planarization is formed between the convex portions on the surface on which the irregularities caused by a pattern exist, separated by a predetermined distance from the convex portions. By forming such a dummy pattern, gaps which are sufficiently narrow compared to distances between the convex portions are formed on the underlying surface for the planarization film. By reducing the irregularities on the underlying surface to such gaps, even if the film to be polished is formed to fill up the gaps, the irregularities that develop on the surface of the film to be polished become shallower. In other words, the film to be polished is planarized to some extent.

As a result, a method of manufacturing a display substrate is offered which enables the film to be polished and the polishing amount of the film to be polished to be made smaller than the dimension of the steps on the underlying surface and the requirements on uniformity in the thickness and polishing amount of the film to be polished to be relaxed. Furthermore, the method of manufacturing a display substrate improves mass-producibility of display substrates with a planarization film.

Another display substrate in accordance with the present invention is a display substrate including: active elements provided on the substrate to control writing of a signal to pixel electrodes; and a light-shield film provided on the active elements to shield the active elements from light, with a planarization film intervening there between so as to fill up irregularities caused by a pattern on an underlying surface for the light-shield film, and characterized in that the substrate includes a dummy pattern for planarization between convex portions on a surface on which the planarization film is formed and also on which the irregularities caused by the pattern exist, so that the dummy pattern is separated by a predetermined distance from the convex portions, the planarization film being formed to fill up gaps between the dummy pattern and the convex portions.

In displays using active elements, for example, TFTs, exposing TFT to light causes leak current. To address this problem, a light-shield film (light-shield layer) is provided. However, as mentioned in the foregoing, problems arise if a light-shield film is formed on an underlying surface having irregularities thereon. The planarization structure described in the Application is therefore suggested for example. However, as mentioned in the foregoing, when the planarization film is formed by CMP, the surface of the film to be polished develops steps that are no smaller in size than the steps caused by the irregularities on the underlying surface. Accordingly, the thickness and polishing amount of the film to be polished need to be greater than the steps on the underlying surface.

According to the structure, the dummy pattern for planarization is formed between the convex portions on the surface on which the irregularities caused by the pattern exist, separated by a predetermined distance from the convex portions. Accordingly, as mentioned in the foregoing, the dummy pattern fills up the concave portions between the convex portions. Only gaps which are sufficiently narrow compared to distances between the convex portions are formed on the underlying surface for the planarization film. Further, since the irregularities on the underlying surface are sufficiently narrow gaps, when the film to be polished is formed to fill up the gaps, the irregularities caused by the gaps which appear on the surface of the film to be polished become shallower. In other words, the film to be polished is planarized by the dummy pattern to some extent.

This enables the film to be polished and the polishing amount to be made smaller than the dimension of the steps on the underlying surface, the requirements on uniformity in the thickness and polishing amount of the film to be polished to be relaxed, and mass-producibility of such display substrates to be improved.

Another method of manufacturing a display substrate in accordance with the present invention is a method of manufacturing a display substrate including: active elements provided on the substrate to control writing of a signal to pixel electrodes; and a light-shield film provided on the active elements to shield the active elements from light, with a planarization film intervening there between so as to fill up irregularities caused by a pattern on an underlying surface for the light-shield film, and characterized in that the method includes the steps of: forming a dummy pattern for planarization between convex portions of the pattern, so that the dummy pattern is separated by a predetermined distance from the convex portions, before forming the planarization film to fill up the irregularities caused by the pattern; and forming the planarization film to fill up gaps between the dummy pattern and the convex portions.

As mentioned in the foregoing, in displays using active elements, for example, TFTs, problems arise if a light-shield film is formed on an underlying surface having irregularities thereon. The planarization structure described in the Application is therefore suggested for example. However, as mentioned in the foregoing, when the planarization film is formed by CMP, the thickness and polishing amount of the film to be polished need to be greater than the steps on the underlying surface.

According to the method, the dummy pattern for planarization is formed between the convex portions on the surface on which the irregularities caused by the pattern exist, separated by a predetermined distance from the convex portions. Accordingly, the dummy pattern fills up the concave portions between the convex portions and allows small gaps to form on the underlying surface for the planarization film. Further, as mentioned in the foregoing, even if the film to be polished is formed to fill up the gaps, the irregularities caused by the gaps which appear on the surface of the film to be polished become shallower, and the film to be polished is planarized to some extent.

This enables the film to be polished and the polishing amount to be made smaller than the dimension of the steps, the requirements on uniformity in the thickness and polishing amount of the film to be polished to be relaxed, and mass-producibility of such display substrates to be improved.

Another display substrate in accordance with the present invention is a display substrate including: active elements provided on the substrate to control writing of a signal to pixel electrodes; patterned layers including wires driving the active elements; and interlayer insulating films provided as layers so as to separate the patterned layers from each other, and characterized in that the substrate includes: a dummy pattern for planarization provided on at least one of surfaces on which the interlayer insulating films are formed, between convex portions of irregularities caused by an associated one of the patterned layers, so that the dummy pattern is separated by a predetermined distance from the convex portions; and an interlayer insulating film, with a planarized surface, filling up gaps between the dummy pattern and the convex portions.

According to the structure, the dummy pattern for planarization is formed on at least one of the surfaces on which the interlayer insulating films are formed. By forming a dummy pattern on top of that interlayer insulating films in this manner, only gaps which are sufficiently narrow compared to distances between the convex portions are formed on the underlying surface for the planarization film for that layer. The forming of such narrow gaps makes shallower the irregularities caused by the gaps which appear on the surface of the film to be polished and planarizes the surface of the film to be polished to some extent when the film to be polished is formed to fill up the gaps.

This enables the film to be polished and the polishing amount to be made smaller than the dimension of the steps on the underlying surface, the requirements on uniformity in the thickness and polishing amount of the film to be polished to be relaxed, and mass-producibility of such display substrates to be improved.

For example, when there are two or more interlayer insulating films, and a dummy pattern for planarization is formed on only one of the surfaces on which the interlayer insulating films are formed, if the dimension of the steps as such (the depth of the concave portions) caused by the irregularities on the substrate surface is too great, it is preferable to form a dummy pattern for planarization on some or each of the surfaces on which the interlayer insulating films are formed. This is because the forming of a dummy pattern for planarization on some or each of the surfaces on which the interlayer insulating films are formed distributes the dimension of the steps as such (the depth of the concave portions) caused by the irregularities on the substrate surface.

Another method of manufacturing a display substrate in accordance with the present invention is a method of manufacturing a display substrate including: active elements provided on the substrate to control writing of a signal to pixel electrodes; patterned layers including wires driving the active elements; and interlayer insulating films provided as layers so as to separate the patterned layers from each other, and is characterized in that the method includes the steps of: forming a dummy pattern for planarization on at least one of surfaces on which the interlayer insulating films are formed, between convex portions of irregularities caused by an associated one of the patterned layers, so that the dummy pattern is separated by a predetermined distance from the convex portions; forming an interlayer insulating film so as to fill up gaps between the dummy pattern and the convex portions; and planarizing a surface of an interlayer insulating film.

According to the method, the dummy pattern for planarization is formed on at least one of the surfaces on which the interlayer insulating films are formed. By forming a dummy pattern on top of that interlayer insulating films in this manner, only gaps which are sufficiently narrow compared to distances between the convex portions are formed on the underlying surface for the planarization film for that layer. The forming of such narrow gaps makes shallower the irregularities caused by the gaps which appear on the surface of the film to be polished and planarizes the surface of the film to be polished to some extent when the film to be polished is formed to fill up the gaps.

This enables the film to be polished and the polishing amount to be made smaller than the dimension of the steps on the underlying surface, the requirements on uniformity in the thickness and polishing amount of the film to be polished to be relaxed, and furthermore, mass-producibility of such display substrates to be improved.

For example, when there are two or more interlayer insulating films, and a dummy pattern for planarization is formed on only one of the surfaces on which the interlayer insulating films are formed, if the dimension of the steps as such (the depth of the concave portions) caused by the irregularities on the substrate surface is too great, it is preferable to form a dummy pattern for planarization on some or each of the surfaces on which the interlayer insulating films are formed. This is because the forming of a dummy pattern for planarization on some or each of the surfaces on which the interlayer insulating films are formed distributes the dimension of the steps as such (the depth of the concave portions) caused by the irregularities on the substrate surface.

Additional objects, advantages and novel features of the invention will be set forth in part in the description which follows, and in part will become apparent to those skilled in the art upon examination of the following or may be learned by practice of the invention.

DESCRIPTION OF THE EMBODIMENTS

Figure 1:
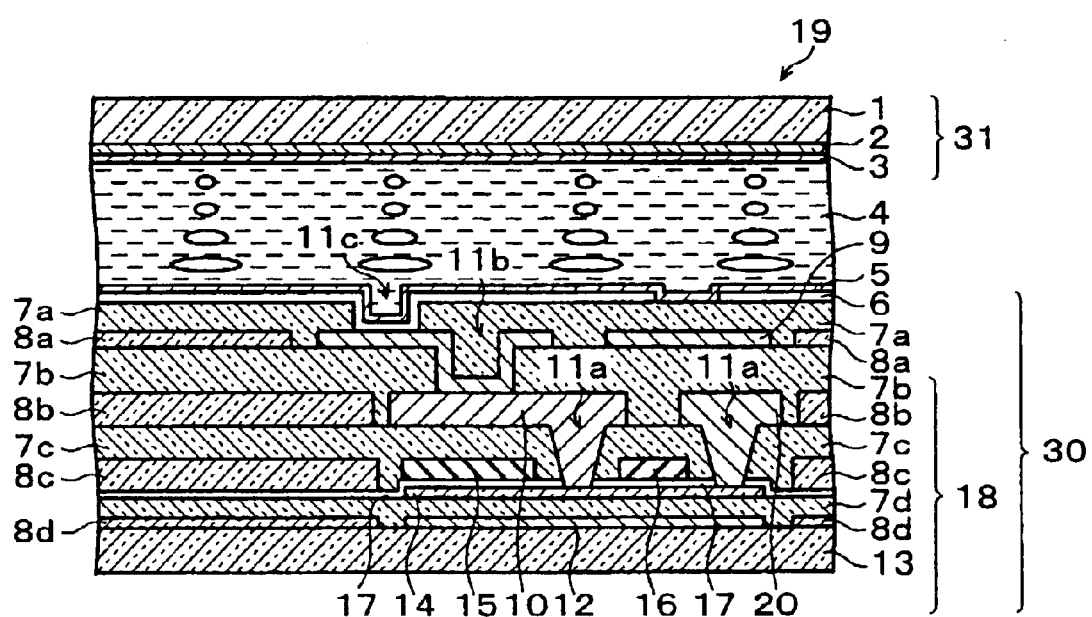
FIG. 1 is a cross-sectional view of a liquid crystal display incorporating a substrate of the present invention on which gate wires and signal wires are provided crossing at right angles, and thin film transistors (TFTs), electrodes, and pixel electrodes are provided at the intersections.
Figure 2:
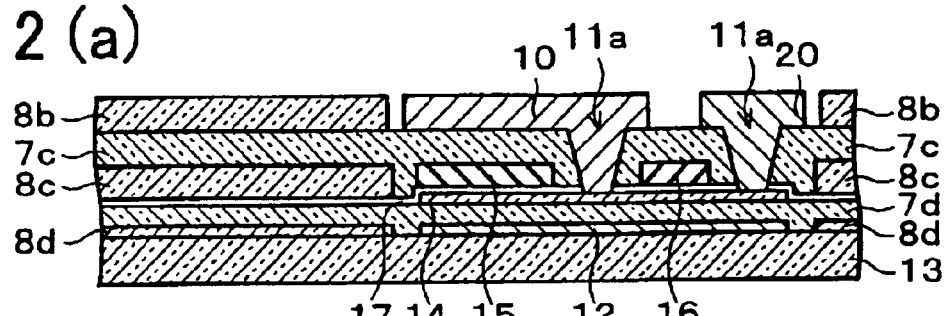
FIG. 2(a), illustrating a method of manufacturing a liquid crystal display of the present embodiment, is a cross-sectional view showing an insulating film pattern 8b having been formed.
FIG. 2(b), illustrating a method of manufacturing a liquid crystal display of the present embodiment, is a cross-sectional view showing a film to be polished after it is deposited on top of FIG. 2(a).
FIG. 2(c), illustrating a method of manufacturing a liquid crystal display of the present embodiment, is a cross-sectional view showing the film in FIG. 2(b) in two portions: one polished and hence removed in a polishing process and another, topped by a flat surface, which remains after the process.
FIG. 2(d), illustrating a method of manufacturing a liquid crystal display of the present embodiment, is a cross-sectional view showing the film after it is polished.
Figure 2:
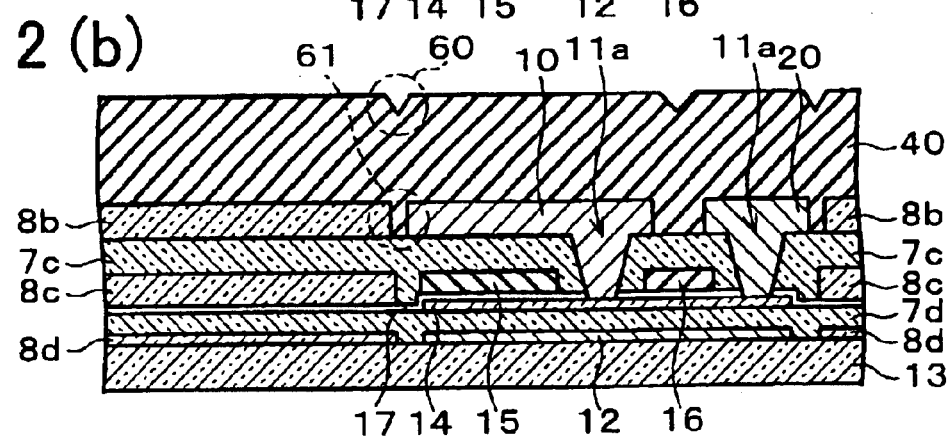
Figure 2:
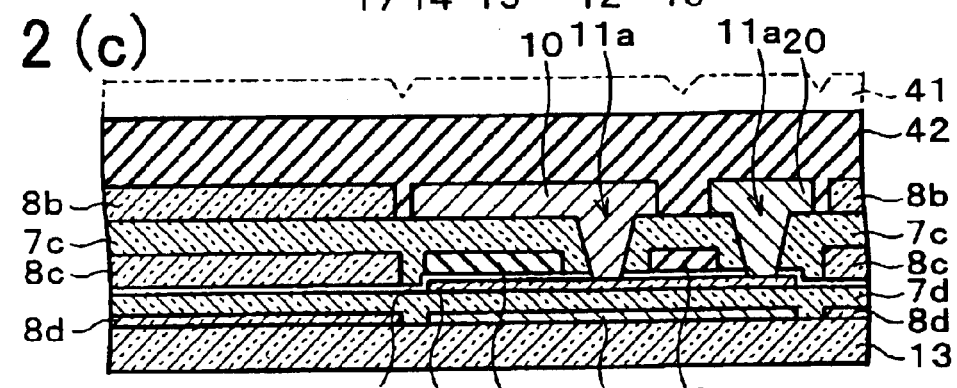
Figure 2:
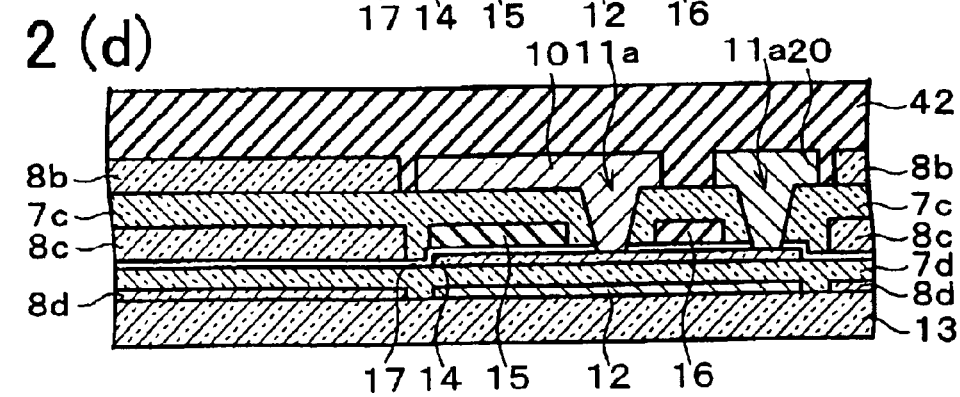

The following will describe an embodiment of the present invention in reference to FIG. 1 and FIG. 2.

A liquid crystal display incorporating a substrate of the present embodiment is of a transparent type. The present invention is however by no means limited to substrates for liquid crystal displays of transparent types, but may be varied in many ways within the scope of the present invention and is applicable for example to substrates for liquid crystal displays of reflective types.

The liquid crystal display of the present embodiment is, as shown in FIG. 1, constituted by: an active matrix substrate 30 in which there are provided patterned pixel electrodes 6, auxiliary capacitance electrodes 15, and thin film transistors (TFTs) 18 on a transparent insulating substrate 13 made of, for example, silicon dioxide glass; and an opposite substrate 31 in which there are provided a transparent opposite electrode 2 and an alignment film 3 on a transparent insulating substrate 1 made of, for example, silicon dioxide glass, the substrates 30, 31 being combined together with a liquid crystal layer 4 intervening there between.

FIG. 1 shows only one of pixels and its proximity. In the active matrix substrate 30, a TFT 18, a patterned pixel electrode 6, and an auxiliary capacitance electrode 15 are formed at every intersection of the gate wires 16 and the signal wire pattern 20 provided on the insulating substrate 13 so as to cross each other at right angles.

In the active matrix substrate 30, the insulating substrate 13 has thereon a first light-shield film pattern 12 and an insulating film pattern 8d separated by a distance from each other. The pattern 12 is provided to shield the TFTs 18 from light. To fill in the gaps between the first light-shield film pattern 12 and the insulating film pattern 8d, an interlayer insulating film 7d is formed covering the first light-shield film pattern 12 and the insulating film pattern 8d. The surface of the interlayer insulating film 7d is planarized by CMP.

The CMP method used in the present embodiment is, for example, the one described in "Shousetsu Handotai CMP Gijutsu (A Detailed Explanation of Semiconductor CMP Technology)" written and edited by Doi Toshirou, Kogyo Chosakai, 10 Jan. 2001.

Forming a film to be polished (interlayer insulating film) on top of the insulating film pattern 8d causes the film to be polished to become irregular (develop steps), since the film to be polished is formed on an irregular surface (underlying surface). The insulating film pattern 8d is provided to reduce the irregularities (steps) which develop in the formation of the film to be polished on top of the insulating film pattern 8*d*. The insulating film pattern 8*d* is a dummy pattern for planarization provided to reduce irregularities (steps) which develop on the polished surface of the interlayer insulating film 7*d* formed on top of the insulating film pattern 8*d* due to the irregularities on the surface (underlying surface) on which the interlayer insulating film 7*d* is formed.

The provision of the insulating film pattern 8*d* which is a dummy pattern for planarization on the insulating substrate 13 reduces irregularities which develop on the surface of the film to be polished (polished surface) in the formation of the film to be polished, when compared with those cases where only the first light-shield film pattern 12 is formed on the insulating substrate 13. Details will be given later. As a result, in the formation of the interlayer insulating film 7*d* by polishing the film to be polished by CMP or another method, the irregularities are already reduced and the film to be polished is planarized to some extent when the film to be polished is deposited; the film to be polished and the portions to be polished can be made thinner.

On the planarized interlayer insulating film 7*d*, a polycrystalline Si film pattern 14 is formed which will act as an active layer for the TFTs 18. On the polycrystalline Si film pattern 14, the gate wires 16 and the auxiliary capacitance electrodes 15 are formed with a gate insulating film 17 intervening there between so as to form the polycrystalline Si film pattern.

On the interlayer insulating film 7*d*, an interlayer insulating film 7*c* planarized by CMP is formed so as to cover the deposition pattern of the polycrystalline Si film pattern 14, the gate insulating film 17, the gate wires 16, and the auxiliary capacitance electrodes 15. An insulating film pattern which is another dummy pattern for planarization is formed on the gate insulating film so as to be separated by a distance from the deposition pattern. More precisely, the insulating film pattern 8*c* is provided on the gate insulating film 17. The interlayer insulating film 7*c* is formed to fill in the gaps between the deposition pattern and the insulating film pattern 8*c* and planarized.

Furthermore, on the planarized interlayer insulating film 7*c*, a lead electrode pattern 10 and a signal wire pattern 20 which are connected to the patterned pixel electrodes 6 via a second light-shield film pattern 9 (will be detailed later) are provided in the same layer. The lead electrode pattern 10 and the signal wire pattern 20 are in contact with the polycrystalline Si film pattern 14 in contact holes 11*a* through the interlayer insulating film 7*c* and its underlying gate insulating film 17. The contact holes 11*a* are formed so as to flank the gate wires 16.

Another interlayer insulating film 7*b* planarized by CMP is formed on the interlayer insulating film 7*c* so as to cover the lead electrode pattern 10 and the signal wire pattern 20. Furthermore, similarly to what was mentioned in the foregoing, an insulating film pattern 8*b* which is a dummy pattern for planarization is formed so as to be separated by a distance from the lead electrode pattern 10 and the signal wire pattern 20. The interlayer insulating film 7*b* is formed to fill in the gaps between the deposition pattern of the lead electrode pattern 10 and the signal wire pattern 20 and the insulating film pattern 8*b* and planarized.

On the planarized interlayer insulating film 7*b*, the second light-shield film pattern 9 is formed and connected to the patterned pixel electrodes 6. The second light-shield film pattern 9 is in contact with the lead electrode pattern 10 in contact holes 11*b* through the interlayer insulating film 7*b*.

Another interlayer insulating film 7*a* planarized by CMP is formed on the interlayer insulating film 7*b* so as to cover the second light-shield film pattern 9. Similarly to what was mentioned in the foregoing, an insulating film pattern 8*a* which is a dummy pattern for planarization is formed so as to be separated by a distance from the second light-shield film pattern 9. The interlayer insulating film 7*a* is formed to fill in the gaps between the second light-shield film pattern 9 and the insulating film pattern 8*a* and planarized.

The patterned pixel electrodes 6 are formed on the interlayer insulating film 7*a* thus planarized. The patterned pixel electrodes 6 are in contact with the second light-shield film pattern 9 in contact holes 11*c* through the interlayer insulating film 7*a*. Finally, an alignment film 5 is formed on the surface of the patterned pixel electrodes 6.

In the structure, the insulating film patterns 8*a*–8*d* which are dummy patterns for planarization are provided so as to reduce irregularities which develop on the polished surfaces of the interlayer insulating films 7*a*–7*d* formed directly on top of the respective insulating film patterns 8*a*–8*d* and planarized by CMP as mentioned in the foregoing. The irregularities on the surfaces of the interlayer insulating films (the film to be polished) 7*a*–7*d* are caused by the irregularities on the underlying surfaces on which the interlayer insulating films 7*a*–7*d* are directly formed respectively.

Therefore, the insulating film patterns 8*a*–8*d* have a thickness which matches the steps of the irregularities on the surface on which the insulating film patterns 8*a*–8*d* are formed. Here, the insulating film pattern 8*d* is formed to have a thickness substantially equal to that of the first light-shield film pattern 12; the insulating film pattern 8*c* is formed to have a thickness substantially equal to the combined thickness of the polycrystalline Si film pattern 14 and the gate wires 16 and the combined thickness of the polycrystalline Si film pattern 14 and the auxiliary capacitance electrodes 15; the insulating film pattern 8*b* is similarly formed to have a thickness substantially equal to that of the lead electrode pattern 10 and the signal wire pattern 20 which are provided in the same layer; and the insulating film pattern 8*a* is formed to have a thickness substantially equal to that of the second light-shield film pattern 9.

The insulating film patterns 8*a*–8*d* need to be formed to be separated by a predetermined distance from the respective irregularity-causing patterns: i.e., the first light-shield film pattern 12 in the case of the insulating film pattern 8*d*, the deposition pattern of the polycrystalline Si film pattern 14, the gate wires 16, and the auxiliary capacitance electrodes 15, the last two components provided in the same layer in the case of the insulating film pattern 8*c*; the lead electrode pattern 10 and the signal wire pattern 20 provided in the same layer in the case of the insulating film pattern 8*b*; and the second light-shield film pattern 9 in the case of the insulating film pattern 8*a*.

Attention should be paid to the fact that if the distance is too great, that is, if the gaps between the insulating film patterns 8*a*–8*d* and the respective irregularity-causing patterns are too great, the provision of the dummy patterns become meaningless, since the concave portions on the surface of the film to be polished are not shallower the gaps between the insulating film patterns 8*a*–8*d* and the associated patterns.

In, for example, FIG. 2(*b*), the concave portions on the surface of the film to be polished refer to the concave portions 60, and the gaps between the insulating film patterns 8*a*–8*d* and the associated patterns refer to the gaps 61.

Therefore, the width of the foregoing gaps, i.e., the width of those gaps between any of the insulating film patterns 8a–8d and its associated pattern is preferably specified to be equal to the sum of the thickness of the insulating film on a side of an electrode before the insulating film pattern processing and the tolerance (alignment precision) in positioning the insulating film pattern and the electrode. Specifically, the width of the gaps between the insulating film patterns 8a–8d and the associated patterns are at least 0.1 µm, preferably 0.2 µm, and at greatest 1 µm, preferably 0.5 µm. If the widths are smaller than these figures, the insulating film on a side of an electrode after insulating film pattern processing partly remains in the shape of a protrusion; if the widths are greater than the figures, it becomes difficult to fill in the gaps smoothly, leaving depressions in the gaps.

Note that in the liquid crystal display 19 shown in FIG. 1 has an insulating film pattern 8a–8d which is a dummy pattern for planarization on each of the surfaces on which the interlayer insulating films 7a–7d are formed. This is especially preferred when, for example, the formation of a dummy pattern for planarization only on one of the surfaces on which the interlayer insulating films are formed would increase a dimension of the steps as such (the depth of the concave portions) caused by the irregularities on the substrate surface, because the formation of the insulating film patterns 8a–8d which are dummy patterns for planarization on the surfaces on which the interlayer insulating films 7a–7d are formed can distribute a dimension of the steps as such (the depth of the concave portions) caused by the irregularities on the substrate surface.

Note also that in consideration of costs in forming more than one insulating film pattern and other conditions, for example, an insulating film pattern may be provided on one of the surfaces on which the interlayer insulating films 7a–7d are formed.

Now, referring to FIG. 2, the following will describe a method of manufacturing a liquid crystal display in accordance with the present embodiment.

(Step 1) A film of polycrystalline Si doped with phosphorous (P) and a WSi film are sequentially deposited on an insulating substrate 13 which is a substrate and patterned into first light-shield film pattern 12.

Next, an insulating film of, for example, silicon dioxide (SiO$_2$), is deposited covering the entire surface. The insulating film is preferably specified to have the same thickness as the film already formed on the insulating substrate 13 (in this case, the first light-shield film pattern 12). Next, the insulating film is patterned into an insulating film pattern 8d.

Next, the insulating film of, for example, SiO$_2$ is deposited on the surface. The deposited insulating film is preferably thicker than the film already formed (the first light-shield film pattern 12). The insulating film is then polished by, for example, CMP to a predetermined thickness. The polishing produces an interlayer insulating film 7d with a predetermined thickness and a flat surface.

(Step 2) An active semiconductor film of, for example, polycrystalline Si is formed on the substrate surface and patterned into a polycrystalline Si film 14.

Next, an insulating film of, for example, SiO$_2$ is deposited on the surface to produce a gate insulating film 17. An electrically conductive film is then deposited on the substrate surface. The electrically conductive film may be replaced by, for example, a P-doped polycrystalline Si film and a WSi film deposited sequentially. The electrically conductive film is then patterned into gate wires 16 and auxiliary capacitance electrodes 15 for additional capacitance elements.

Next, an insulating film of, for example, SiO$_2$ is deposited on the substrate surface. The deposited insulating film is preferably specified to have a thickness substantially equal to the combined thickness of the films already formed on the interlayer insulating film 7d. The combined thickness of the films already formed on the interlayer insulating film 7d here refers to the sum of the thickness of the gate wire 16 and that of the polycrystalline Si film 14 and the sum of the thickness of the auxiliary capacitance electrodes 15 and that of the polycrystalline Si film 14. The deposited insulating film is then patterned into an insulating film pattern 8c.

Next, an insulating film of, for example, SiO$_2$ is deposited on the substrate surface. The insulating film is preferably thicker than the films already formed on the interlayer insulating film 7d. The insulating film is then polished by, for example, CMP to a predetermined thickness. The polishing produces an interlayer insulating film 7c with a predetermined thickness and a flat surface.

(Step 3) The interlayer insulating film 7c and the gate insulating film 17 are partly etched away where specified to form contact holes 11a. Next, an electrically conductive film is deposited. The electrically conductive film here may be replaced by, for example, a TiW film, Al film, and TiW film deposited sequentially. Next, the film is patterned into a lead electrode pattern 10 and a signal wire pattern 20.

Next, an insulating film of, for example, SiO$_2$ is deposited on the substrate surface. The deposited insulating film is preferably specified to have a thickness substantially equal to the combined thickness of the films already formed on the interlayer insulating film 7c. The combined thickness of the films already formed on the interlayer insulating film 7c here refers to the thickness of the lead electrode pattern 10 or that of the signal wire pattern 20. The deposited insulating film is then patterned into an insulating film pattern 8b. FIG. 2(a) shows the insulating film pattern 8b sitting on the interlayer insulating film 7c, separated from the lead electrode pattern 10 and the signal wire pattern 20 (electrically conductive layer patterns).

In this manner, the insulating film pattern 8b of substantially the same thickness as the electrically conductive layer patterns is formed between step-causing electrically conductive layer patterns, such as the lead electrode pattern 10 and the signal wire pattern 20, so as to be separated from the electrically conductive layer patterns.

FIG. 2(b) shows an insulating film 40 to be polished having been deposited on what is shown in FIG. 2(a). As shown in FIG. 2(b), the film to be polished (interlayer insulating film) 40 is deposited to fill up the irregularities of the lead electrode pattern 10, the signal wire pattern 20, the interlayer insulating film 7c, and the insulating film pattern 8b. In this manner, the deposition of the film 40 to be polished following the process shown in FIG. 2(a) fills up gaps 61 between the lead electrode pattern 10, the signal wire pattern 20, and the insulating film pattern 8b with the film 40 to be polished.

To fill the gaps (irregularities) by depositing the film to be polished (interlayer insulating film) 40, the film 40 to be polished is preferably deposited under those conditions which will provide excellent step coverage.

Small concave portions 60 grow on the surface of the film 40 to be polished right above the gaps 61 as shown in FIG. 2(b) when the film 40 to be polished is deposited on the irregular top surface shown in FIG. 2(a). Since such concave portions grow above gaps, the gaps 61 are formed, for example, so that the concave portions 60 in the film 40 to be polished are reduced in size and depth. The size (width) of the gaps 61 is determined by the formation of the insulating film pattern 8b. Accordingly, in the step of forming the insulating film pattern 8b, the shape of the gaps 61 is considered.

Figure 14:
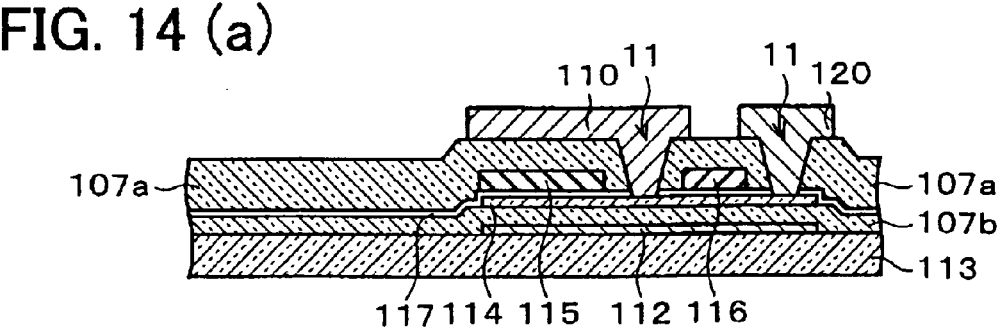
FIG. 14(a), illustrating a method of manufacturing a conventional liquid crystal display, is a cross-sectional view showing a state before a film to be polished is formed.
FIG. 14(b), illustrating a method of manufacturing a conventional liquid crystal display, is a cross-sectional view showing a film to be polished having been deposited.
FIG. 14(c), illustrating a method of manufacturing a conventional liquid crystal display, is a cross-sectional view showing the film to be polished in FIG. 14(b) having been polished and hence partly removed with the remaining portion planarized.
FIG. 14(d), illustrating a method of manufacturing a conventional liquid crystal display, is a cross-sectional view the film to be polished having been polished.
Figure 14:
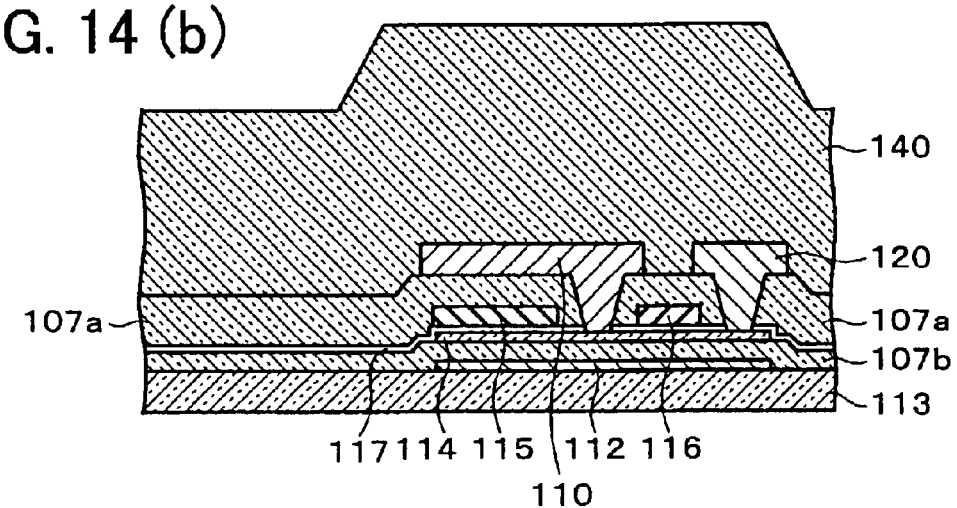
Figure 14:
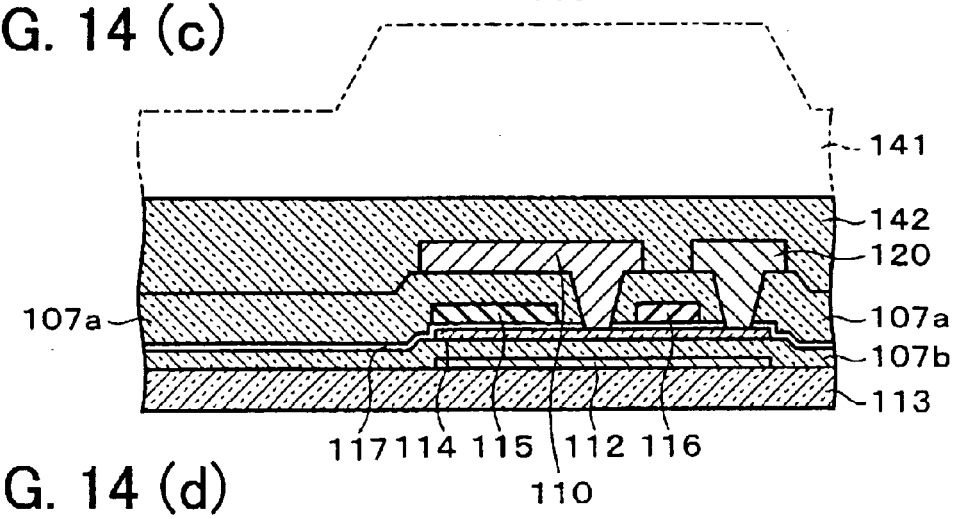
Figure 14:
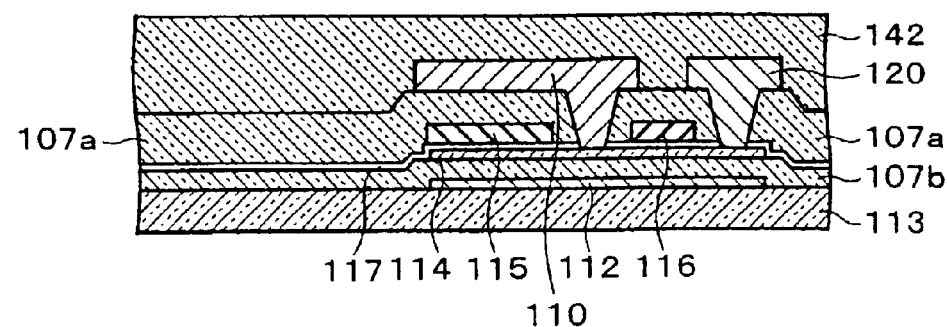

In the present embodiment, the formation of the insulating film pattern 8b causes the formation of the concave portions 60 above the gaps 61 when the film 40 to be polished is deposited. However, if the film 40 to be polished is deposited without forming the insulating film pattern 8b, the result is, for example, the film 140 to be polished in FIG. 14(b). In other words, the concave portions in the film 140 to be polished are wider and deeper.

If the interlayer insulating film 7b–7d are deposited as shown in FIGS. 2(a)–2(d), the concave portions which develop in depositing the interlayer insulating films, especially, the concave portions, are reduced in depth by depositing the insulating film patterns 8b–8d beneath the associated interlayer insulating films. The concave portions, especially, the concave portions, are reduced more in depth by depositing an insulating film pattern before the deposition of each interlayer insulating film than by depositing only one insulating film pattern, because the latter method distributes the irregularities (steps) which develop in the sequential deposition of the interlayer insulating films.

Next, the film 40 to be polished is planarized by, for example, polishing the film 40 to be polished. The polishing is done by, for example, CMP. FIG. 2(c) shows a portion of the film 40 to be polished having been polished and hence removed (a polished portion 41) and another remaining after the polishing (a polished insulating film 42). FIG. 2(d) shows a state after the polishing. The insulating film 42 after polishing will become an interlayer insulating film (7b).

Smaller irregularities as in the film 40 to be polished allow the film 40 to be polished to be thinner and removed less (the polishing amount, or thickness, is reduced) in the polishing (planarization) of the film to be polished. A comparison of the film 140 to be polished in FIG. 14(b) and the film 40 to be polished in FIG. 2(b) demonstrates that the formation of the insulating film pattern 8b reduces the irregularities in the film 40 to be polished in size and also reduces the film 40 to be polished in thickness. A comparison of the polished portion 141 in FIG. 14(b) and the polished portion 41 in FIG. 2(b) demonstrates that the formation of the insulating film pattern 8b reduces the polishing amount in CMP.

If the film 40 to be polished is to be planarized by CMP, CMP is preferably done after the film 40 to be polished is tentatively planarized to some extent. By the tentative planarization to some extent and the subsequent CMP planarization of remaining irregularities in this manner, the thickness of the film 40 to be polished and the polishing amount in CMP are further reduced.

The thicknesses of the films in the layers may be specified, for example, as in Table 1.

TABLE 1

| | |
|---|---|
| First Light-Shield Layer 12 | 150 nm |
| TFT Active Layer (Polycrystalline Si Film 14) | 50 nm |
| Gate Wires 16 | 300 nm |
| Signal Wires 20 | 650 nm |
| Second Light-Shield Layer 9 | 125 nm |
| Pixel Electrode 6 | 100 nm |

Supposing that the thicknesses of the layers and films in FIG. 2 are specified as in Table 1, the insulating film pattern 8b is 700 nm thick and positioned about 0.7 μm away from the signal wire pattern 20. The film 40 to be polished, provided following the pattern 8b, is 800 nm thick. The polished portion 41 is 500 nm thick, that is, the film 40 to be polished is polished and removed about 500 nm deep by CMP to the polished insulating film 42 (interlayer insulating film 7b).

Reference is also made to FIG. 1 in the following description.

(Step 4) The interlayer insulating film 7b is partly etched away where specified to form contact holes 11b. Next, an optically shielding, electrically conductive film of, for example, TiW is deposited so as to cover the entire substrate surface by, for example, vapor deposition or sputtering and patterned into an electrically conductive second light-shield film pattern 9.

An insulating film of, for example, SiO$_2$ is then deposited covering the entire substrate surface. The thickness of the film is preferably specified to be substantially equal to the that of the film already formed on the interlayer insulating film 7b, in this case, that of the second light-shield film pattern 9. Next, the insulating film is patterned into an insulating film pattern 8a.

Next, an insulating film is formed covering the entire substrate surface by, for example, CVD and polished by, for example, CMP down to a predetermined thickness to produce an interlayer insulating film 7a with a flat surface.

(Step 5) The interlayer insulating film 7a is partly etched away where specified to produce contact holes 11c. Next, for example, an ITO film is deposited up to a thickness of 100 nm covering the entire substrate surface and patterned into patterned pixel electrodes 6. An alignment film 5, a liquid crystal layer 4, an alignment film 3, an opposite electrode 2, and an insulating substrate 1 which are not detailed here are fabricated by a known method.

Example 1 demonstrates steps 1–5; example 2 demonstrates steps 2, 3, and 5; example 3 demonstrates steps 1, 2, 3, and 5; and example 4 demonstrates steps 2–5.

Now, the following will describe relaxing of requirements on uniformity in the thickness of the film to be polished and the thickness of the polished portion. To restrict the variations in thickness of the polished film to ±15% (300±45 nm) or less, both the uniformity in thickness of the film to be polished and the uniformity in thickness of the portion polished and hence removed by CMP need to be restricted to 1.5% or less according to a conventional method. In contrast, according to a method of the present embodiment, it is sufficient if the uniformity in thickness of the film to be polished and the uniformity in thickness of the portion polished and hence removed by CMP are about 3%.

The uniformity in thickness of the film to be polished and the uniformity in thickness of the portion polished and hence removed by CMP are calculable. For simplicity, it is supposed that the thickness of the film to be polished is equal to the variations in the polishing amount in CMP. Supposing that the thickness of the film to be polished is 800±Δ (nm) and that the thickness polished and removed by CMP is 500±Δ (nm), $(\Delta^2+\Delta^2)^{1/2} \leq 45$ (nm); therefore, $\Delta \leq 32$ nm. Under these conditions, it is sufficient if the uniformity in thickness of the film to be polished is specified to Δ/800= 32/800=4% and the uniformity in thickness of the portion polished and hence removed by CMP is specified to Δ/500= 32/500=6.4%.

In a typical liquid crystal display, the signal wire pattern 20 is the thickest as shown in Table 1. The method of manufacturing a liquid crystal display in accordance with the present embodiment is remarkably effective in planarizing an insulating film formed on top of such a signal wire pattern 20. To thin down the film 40 to be polished and reduce the polishing amount in CMP further, it is recommended that the underlying layer to be planarized should be planarized as much as possible. Therefore, it is preferred if, as shown in FIG. 1, each interlayer insulating film 7 is planarized by first forming an insulating film pattern 8 and thereafter forming the interlayer insulating film 7 so as to fill up the irregularities caused by the insulating film pattern 8, etc. However, if each interlayer insulating film 7 is preceded by the formation of an insulating film pattern 8 and planarized, manufacturing cost and productivity problems may arise due to an accordingly increased number of steps. For these reasons, the structure of the interlayer insulating films 7 is determined in consideration of manufacturing cost and productivity too.

EXAMPLE 1

FIG. 1 shows an example case of a liquid crystal display including: thin film transistors, additional capacitances (electrodes), and transparent pixel electrodes provided at intersections of gate wires and signal wires crossing each other at right angles; a first light-shield film beneath the thin film transistors with an interlayer insulating film intervening there between; and a second light-shield film on top of the signal lines with an interlayer insulating film intervening there between, wherein each interlayer insulating film has an insulating film pattern and is planarized by CMP.

If any one of the interlayer insulating films has no insulating film pattern in relation to manufacturing cost and productivity, that interlayer insulating film may be subjected to a conventional method, such as simple CVD whereby an insulating film is deposited.

(1) A film (50 nm) of polycrystalline Si doped with phosphorous (P) and a WSi film (100 nm) are sequentially deposited on an insulating substrate 13 which is a substrate and patterned into first light-shield film pattern 12.

(2) An insulating film of $SiO_2$ is deposited covering the entire surface by, for example, plasma CVD using TEOS as a source gas. The thickness of the insulating film is specified substantially equal to that of the first light-shield film pattern 12 (for example, 150 nm). Next, the insulating film patterned into an insulating film pattern 8d. Another insulating film of $SiO_2$ is then deposited covering the entire substrate surface by, for example, CVD. The insulating film is specified thicker than the first light-shield film pattern 12 (for example, 650 nm). Next, the insulating film is polished down to a predetermined thickness by CMP. For example, about 250 nm of the insulating film is polished and hence removed to form an interlayer insulating film 7d with a predetermined thickness (650−250=400 nm) and a flat surface. Surface steps remaining after the planarization can be made 50 nm or less.

(3) A film (50 nm) of polycrystalline Si is deposited covering the entire substrate surface by, for example, CVD and patterned into a polycrystalline Si film 14. Next, a gate insulating film 17 (80 nm) of $SiO_2$ is deposited covering the entire substrate surface by, for example, CVD. A P-doped polycrystalline Si film (150 nm) and a WSi film (150 nm) are then sequentially deposited covering the entire substrate surface and patterned into gate wires 16 and auxiliary capacitance electrodes 15 for additional capacitance elements.

(4) An insulating film of $SiO_2$ is deposited covering the entire substrate surface by, for example, plasma CVD using TEOS as a source gas. The thickness of the insulating film is specified substantially equal to a combined thickness of the gate wires 16 and the polycrystalline Si film 14 (for example, 350 nm). Next, the insulating film is patterned into an insulating film pattern 8c. Subsequently, an insulating film of $SiO_2$ is deposited covering the entire substrate surface by, for example, CVD. The thickness of the insulating film is specified thicker than the combined thickness of the gate wires 16 and the polycrystalline Si film 14 (for example, 800 nm). The insulating film is then polished down to a predetermined thickness by CMP. For example, about 400 nm of the insulating film is polished and hence removed to form an interlayer insulating film 7c with a flat surface. Surface steps remaining after the planarization can be made 100 nm or less.

(5) The interlayer insulating film 7c and the gate insulating film 17 are partly etched away where specified to form contact holes 11a. Next, a TiW film (150 nm), an Al film (400 nm), and a TiW film (100 nm) are sequentially deposited covering the entire substrate surface and patterned into a lead electrode pattern 10 and a signal wire pattern 20.

(6) A silicon nitride (SiN) film containing large amounts of hydrogen may be deposited covering the entire substrate surface by, for example, plasma CVD so as to terminate dangling bonds in the polycrystalline Si film. Note that the SiN film is not completely transparent to light. Accordingly, the SiN film may be patterned to open apertures there through, so that a liquid crystal display exhibits enhanced brightness. The structure detailed in this item (6) is omitted from FIG. 1 here and also throughout the following examples.

(7) An insulating film of $SiO_2$ is deposited covering the entire substrate surface up to a thickness substantially equal to that of the signal wires (for example 650 nm) by, for example, plasma CVD using TEOS as a source gas and patterned into an insulating film pattern 8b. Next, an insulating film is then deposited covering the entire substrate surface up to a thickness greater than that of the signal wires (for example, 800 nm) by, for example, CVD. The insulating film is then polished down to a predetermined thickness by CMP. For example, about 500 nm of the insulating film is polished and hence removed to form an interlayer insulating film 7b with a flat surface. Surface steps remaining after the planarization can be made 100 nm or less.

(8) The interlayer insulating film 7b is partly etched away where specified to form contact holes 11b. Next, a TiW film (125 nm) is deposited covering the entire substrate surface by, for example, vapor deposition or sputtering and patterned to produce an electrically conductive second light-shield film pattern 9.

(9) An insulating film of $SiO_2$ is deposited covering the entire substrate surface up to a thickness substantially equal to that of the second light-shield film pattern 9 (for example, 125 nm) by, for example, plasma CVD using TEOS as a source gas and patterned into an insulating film pattern 8a. Next, an insulating film is deposited covering the entire substrate surface by, for example, CVD. The thickness of the insulating film is specified thicker than the signal lines (for example, 500 nm). The insulating film is then polished down to a predetermined thickness by CMP. For example, about 200 nm of the insulating film is polished and hence removed to produce an interlayer insulating film 7a with a flat surface. Surface steps remaining after the planarization can be made 50 nm or less.

(10) The interlayer insulating film is partly etched away where specified to form contact holes 11c. Next, an ITO film of, for example, a 100-nm thickness is deposited covering the entire substrate surface and patterned into patterned pixel electrodes 6.

Table 2 shows an example of polishing conditions in CMP.

The insulating film patterns 8a–8d of the present example are made of $SiO_2$. However, the insulating film patterns 8a–8d may be silicon dioxide films, silicon nitride films, or a combination of a silicon dioxide film/films and a silicon nitride film/films. The silicon nitride film (silicon nitride film) could be deposited by, for example, plasma CVD.

TABLE 2

| | |
|---|---|
| Polish Cloth | IC-1400-050A2 |
| CMP Polish Cloth | supreme RN-H24PJ |
| Slurry | Semi-Sperse 12 (1-part-in-2 dilution of Semi-Sperse 25 made by Cabot Corporation) |
| Polishing Liquid Flow Rate | 150 sccm |
| Polishing Head Pressure | 8 psi |
| Carrier Revolution | 32 rpm |
| Platen Revolution | 28 rpm |

The interlayer insulating films 7a–7d of the present example are made of $SiO_2$. However, the interlayer insulating films 7a–7d may be silicon dioxide films, silicon nitride films, or a combination of a silicon dioxide film/films and a silicon nitride film/films. The silicon nitride film could be deposited by, for example, plasma CVD.

FIGS. 3(a)–3(e) show the insulating film patterns being formed as a layered structure. Referring to FIG. 3(a), a silicon nitride film 51 is deposited on the interlayer insulating film 7c, the lead electrode pattern 10, and the signal wire pattern 20, and a silicon dioxide film 50 is deposited on the silicon nitride film 51.

Next, the silicon nitride film 51 and the silicon dioxide film 50 are patterned to produce what is shown in FIG. 3(b). The silicon nitride film 51 and the silicon dioxide film 50 in FIG. 3(b) are equivalents to the insulating film pattern 8b in FIG. 2.

Figure 3:
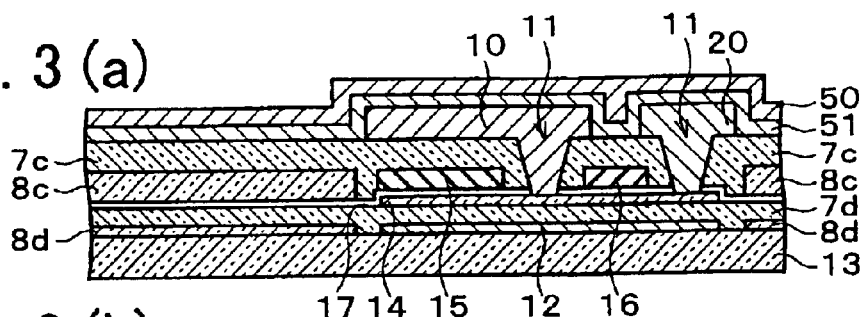
FIG. 3(a), illustrating a method of manufacturing a liquid crystal display as an example of the present invention (in which an insulating film pattern has a layered structure), is a cross-sectional view showing a silicon nitride film and a silicon dioxide film after they are deposited.
FIG. 3(b), illustrating a method of manufacturing a liquid crystal display as an example of the present invention (in which an insulating film pattern has a layered structure), is a cross-sectional view showing the silicon nitride film and the silicon dioxide film after they are patterned.
FIG. 3(c), illustrating a method of manufacturing a liquid crystal display as an example of the present invention (in which an insulating film pattern has a layered structure), is a cross-sectional view showing a film to be polished after it is deposited on top of FIG. 3(b).
FIG. 3(d), illustrating a method of manufacturing a liquid crystal display as an example of the present invention (in which an insulating film pattern has a layered structure), is a cross-sectional view showing the polished film in two portions: one polished and hence removed in a polishing process and another remaining after the process.
FIG. 3(e), illustrating a method of manufacturing a liquid crystal display as an example of the present invention (in which an insulating film pattern has a layered structure), is a cross-sectional view showing the film to be polished after it is polished.
Figure 3:
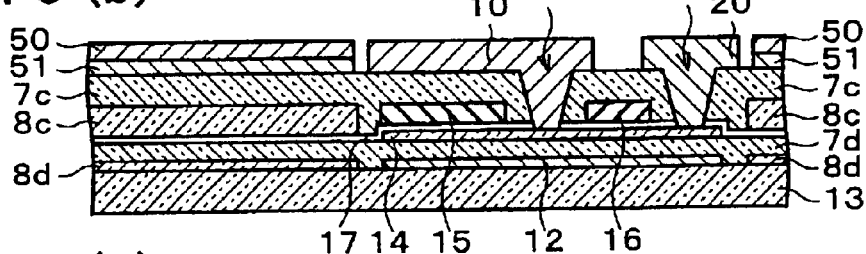
Figure 3:
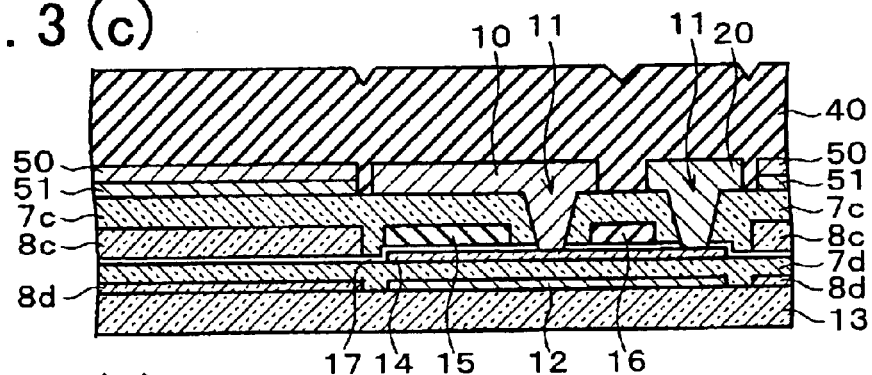
Figure 3:
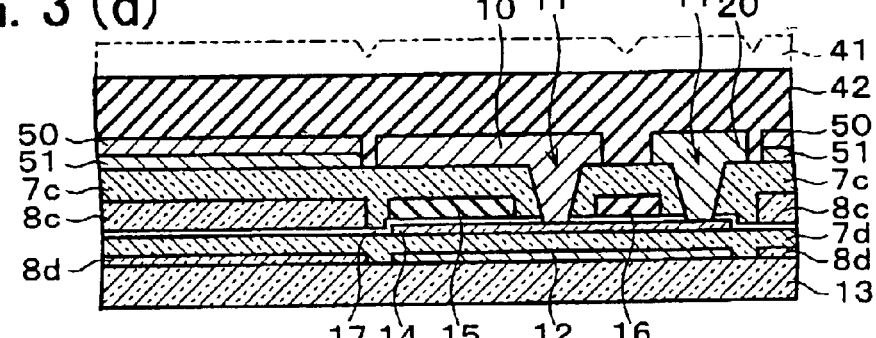
Figure 3:
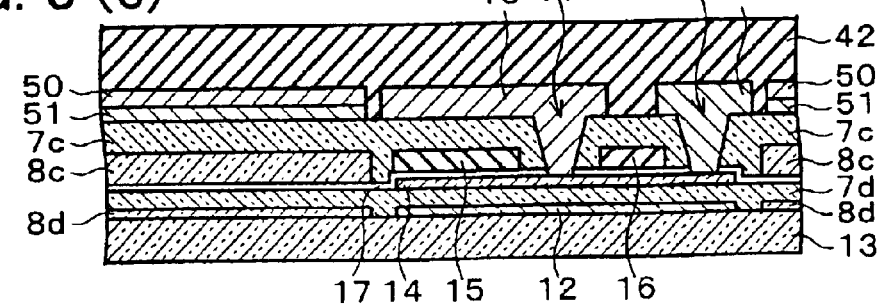

In the case where the layered structure is provided on top of the silicon nitride film 51 as in FIG. 3, when the insulating film patterns are patterned by, for example, dry etching, if faster conditions are adopted for the silicon dioxide film 50 than the silicon nitride film 51, the silicon nitride film acts as an etching stopper and improves precision in the manufacture of the insulating film patterns. Note that silicon nitride films are less transparent than silicon dioxide films; it is preferable in some cases to use silicon dioxide films exclusively.

Planarization effects are not affected regardless whether an insulating film is deposited in advance covering the entire substrate surface before the insulating film patterns are formed or an insulating film is deposited after being polished by CMP.

Figure 4:
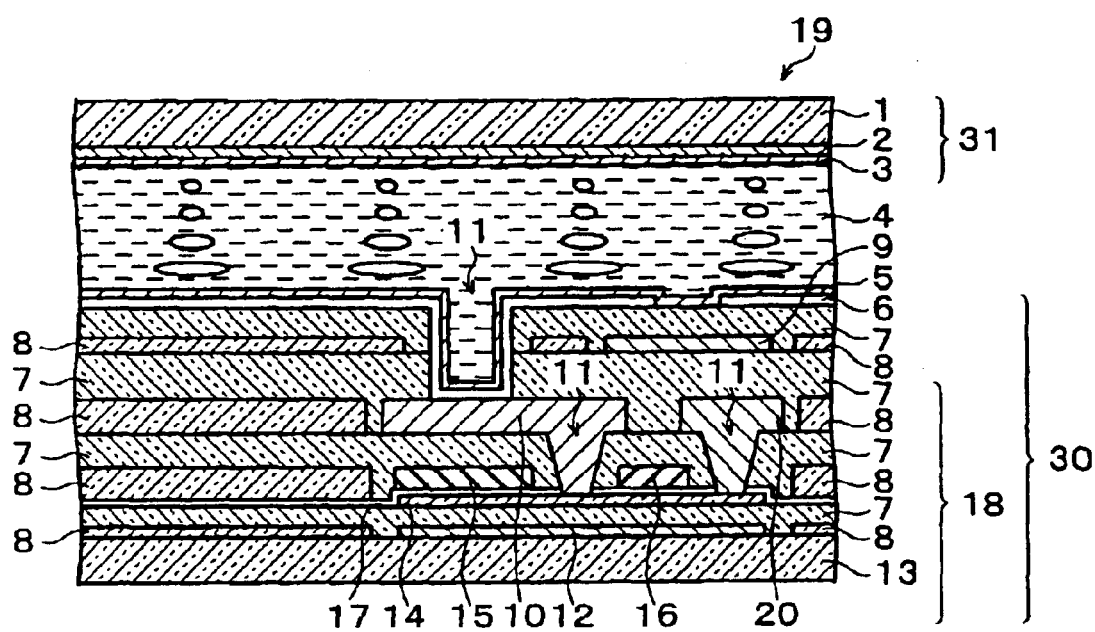
FIG. 4, illustrating an application example of the liquid crystal display in FIG. 1, is a cross-sectional view showing a liquid crystal display having a structure in which each pixel electrode is connected to the drain region of a TFT via a metal (the same layer as the signal lines).
Figure 5:
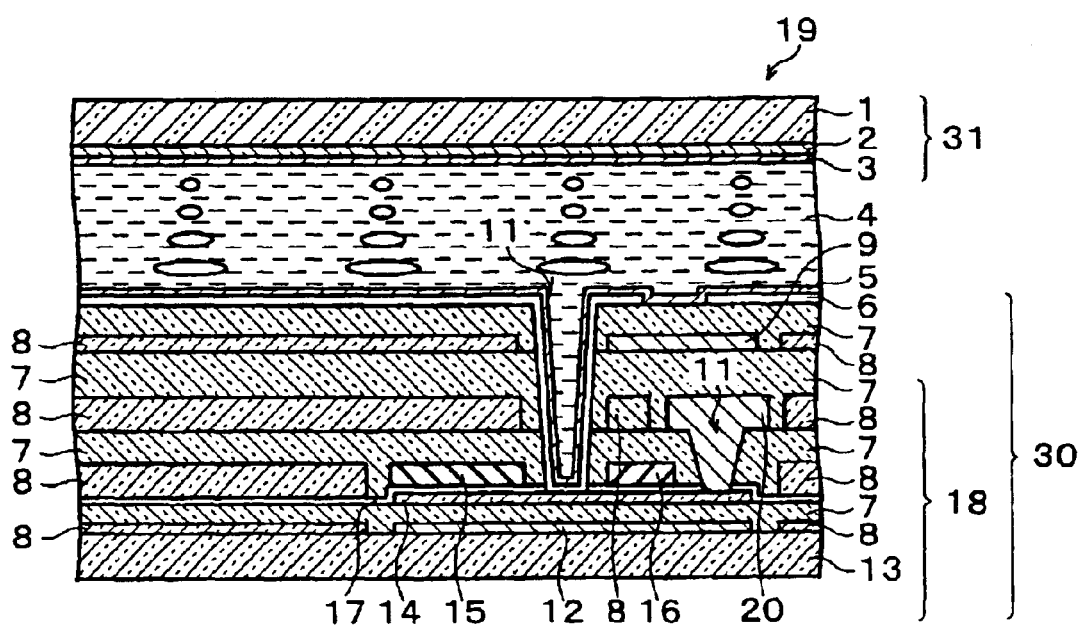
FIG. 5, illustrating an application example of the liquid crystal display in FIG. 1, is a cross-sectional view showing a liquid crystal display having a structure in which each pixel electrode is connected directly to the drain region of a TFT.

The liquid crystal displays in FIGS. 4, 5 are application examples of, and differ from, the liquid crystal display in FIG. 1 in the structure of the patterned pixel electrodes 6 and in the structure connecting the drain regions of the TFTs together respectively. The two displays share the same interlayer structure as the one in the foregoing example (FIG. 1). FIG. 4 shows a structure connecting the patterned pixel electrodes 6 to the drain regions of the TFTs via a metal (the same layer as the signal lines). FIG. 5 shows a structure connecting the patterned pixel electrodes 6 directly to the drains regions of the TFTs.

EXAMPLE 2

Figure 6:
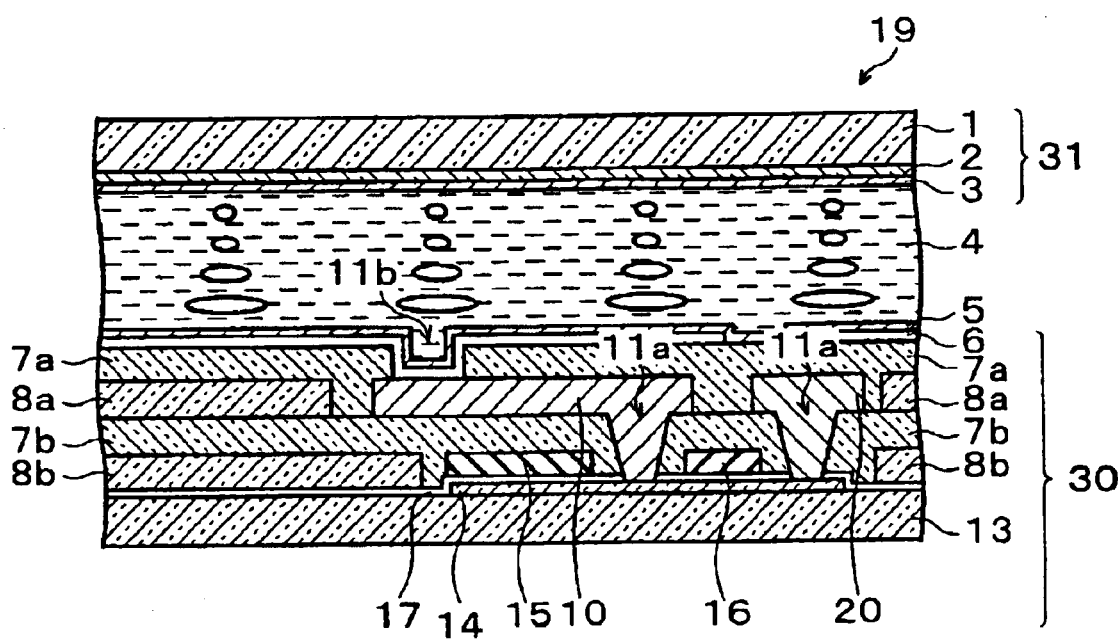
FIG. 6, illustrating a liquid crystal display which is an example of the present invention, is a cross-sectional view showing a liquid crystal display in which thin film transistors, additional capacitances, and transparent pixel electrodes are provided at intersections where gate lines and signal lines cross at right angles, all interlayer insulating films having an insulating film pattern and being planarized by CMP.

FIG. 6 shows an example case of a liquid crystal display including thin film transistors, additional capacitances, and transparent pixel electrodes provided at intersections of gate lines and signal lines crossing each other at right angles, wherein each interlayer insulating film has an insulating film pattern and is planarized by CMP.

If any one of the interlayer insulating films has no insulating film pattern in relation to manufacturing cost and productivity, that interlayer insulating film may be subjected to a conventional method, such as simple CVD whereby an insulating film is deposited.

(1) A film (50 nm) of polycrystalline Si is deposited covering the entire surface of the insulating substrate 13 which is a substrate by, for example, CVD and patterned into a polycrystalline Si film 14. Next, a gate insulating film (80 nm) of $SiO_2$ is deposited by, for example, CVD. A P-doped polycrystalline Si film (150 nm) and a WSi film (150 nm) are then sequentially deposited covering the entire substrate surface and patterned into gate wires 16 and auxiliary capacitance electrodes 15 for additional capacitance elements.

(2) A film of $SiO_2$ is deposited covering the entire surface by, for example, plasma CVD using TEOS as a source gas. The thickness of the deposited insulating film is specified substantially equal to a combined thickness of the gate wires 16 and the polycrystalline Si film 14 (for example, 350 nm). Next, the insulating film patterned into an insulating film pattern 8b. Subsequently, an insulating film of $SiO_2$ is then deposited covering the entire surface by, for example, CVD. The thickness of the insulating film is specified thicker than the combined thickness of the gate wires 16 and the polycrystalline Si film (for example, 800 nm). The insulating film is polished down to a predetermined thickness by CMP. For example, about 400 nm of the insulating film is polished and hence removed to form an interlayer insulating film 7b with a flat surface. Surface steps remaining after the planarization can be made 100 nm or less.

(3) The interlayer insulating film 7b and the gate insulating film 17 are partly etched away where specified to form contact holes 11a. Next, a TiW film (150 nm), an Al film (400 nm), and a TiW film (100 nm) are sequentially deposited covering the entire surface and patterned into the lead electrode pattern 10 and the signal wire pattern 20.

(4) An insulating film of $SiO_2$ is deposited covering the entire surface up to a thickness substantially equal to that of the signal wires (for example, 650 nm) by, for example, plasma CVD using TEOS as a source gas and patterned into an insulating film pattern 8a. Next, an insulating film is deposited covering the entire surface by, for example, CVD. The thickness of the insulating film is specified thicker than the signal wires (for example, 800 nm). The insulating film is then polished down to a predetermined thickness by CMP. For example, about 500 nm of the insulating film is polished and hence removed to produce an interlayer insulating film 7a with a flat surface. Surface steps remaining after the planarization can be made 100 nm or less.

(5) The interlayer insulating film 7a is partly etched away where specified to form contact holes 11b. Next, An ITO film of, for example, 100-nm thickness is deposited covering the entire surface and patterned into patterned pixel electrodes 6.

Figure 7:
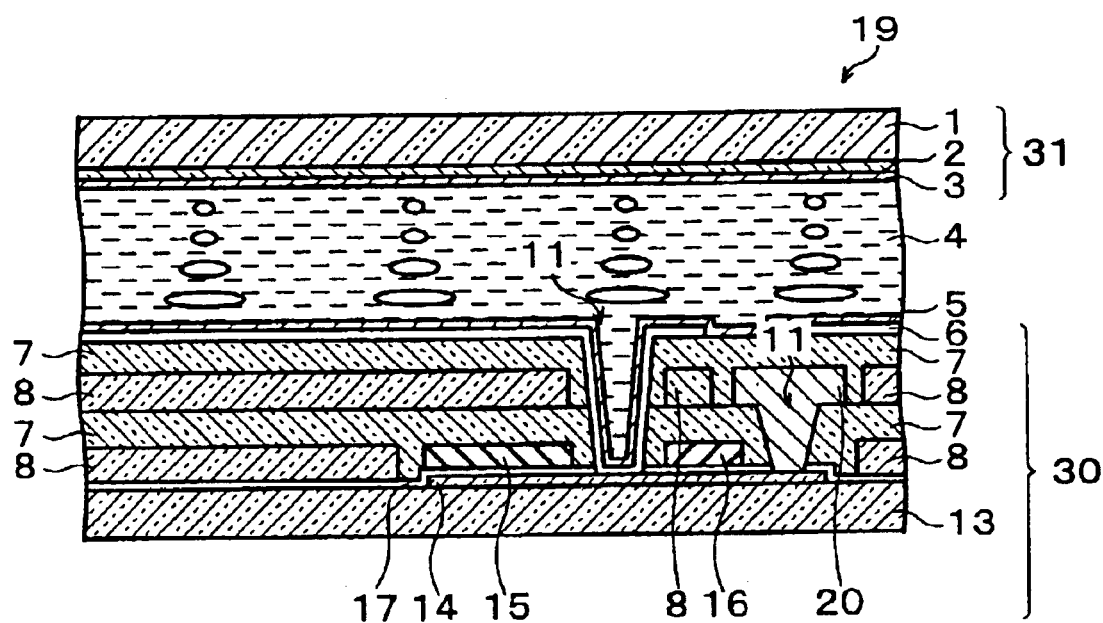
FIG. 7, illustrating an application example of the liquid crystal display in FIG. 6, is a cross-sectional view showing a liquid crystal display having a structure in which each pixel electrode is connected directly to the drain region of a TFT.

FIG. 7 is an application example of the liquid crystal display in FIG. 6 and has a structure connecting the patterned pixel electrodes 6 directly to the drain regions of the TFTs.

EXAMPLE 3

Figure 8:
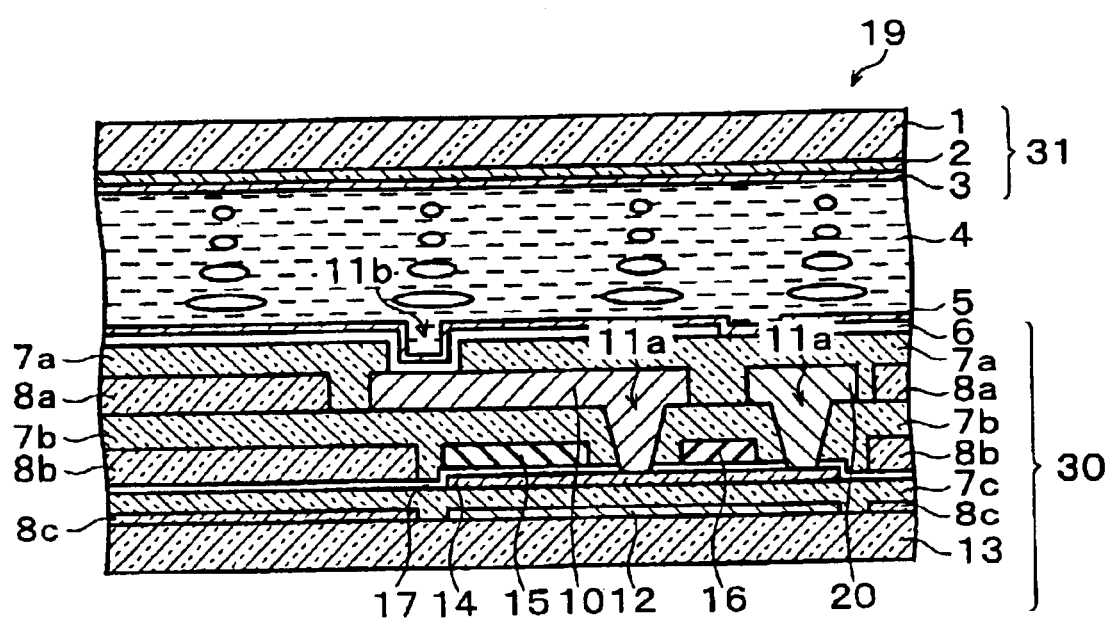
FIG. 8, illustrating a liquid crystal display which is an example of the present invention, is a cross-sectional view showing a liquid crystal display in which thin film transistors, additional capacitances, and transparent pixel electrodes are provided at intersections where gate lines and signal lines cross at right angles, the thin film transistors being provided on top of a first light-shield film with an interlayer insulating film intervening there between, all interlayer insulating films having an insulating film pattern and being planarized by CMP.

FIG. 8 shows an example case of a liquid crystal display including thin film transistors, additional capacitances, and transparent pixel electrodes provided at intersections of gate lines and signal lines crossing each other at right angles; and a first light-shield film beneath the thin film transistors with an interlayer insulating film intervening there between, wherein each interlayer insulating film has an insulating film pattern and is planarized by CMP.

If any one of the interlayer insulating films has no insulating film pattern in relation to manufacturing cost and productivity, that interlayer insulating film may be subjected to a conventional method, such as simple CVD whereby an insulating film is deposited.

(1) A film (50 nm) of polycrystalline Si doped with P and a WSi film (100 nm) are sequentially deposited on an insulating substrate 13 which is a substrate and patterned into a first light-shield film pattern 12.

(2) An insulating film of $SiO_2$ is deposited covering the entire surface up to a thickness substantially equal to that of the first light-shield film pattern 12 (for example, 150 nm) by, for example, plasma CVD using TEOS as a source gas and patterned into an insulating film pattern 8c. Next, an insulating film of $SiO_2$ is deposited covering the entire surface by, for example, CVD. The thickness of the insulating film is specified thicker than the first light-shield film pattern 12 (for example, 650 nm). The insulating film is then polished down to a predetermined thickness by CMP. For example, about 250 nm of the insulating film is polished and hence removed to produce an interlayer insulating film 7c with a flat surface. Surface steps remaining after the planarization can be made 50 nm or less.

(3) A film (50 nm) of polycrystalline Si is deposited covering the entire surface by, for example, CVD and patterned into a polycrystalline Si film 14. Next, a gate insulating film 17 (80 nm) of $SiO_2$ is deposited by, for example, CVD. A film (150 nm) of P-doped polycrystalline Si and a WSi film (150 nm) are then sequentially deposited covering the entire surface and patterned into gate wires 16 and auxiliary capacitance electrodes 15 for additional capacitance elements.

(4) An insulating film of $SiO_2$ is deposited covering the entire surface up to a thickness substantially equal to a combined thickness of the gate wires 16 and the polycrystalline Si film 14 (for example, 350 nm) by, for example, plasma CVD using TEOS as a source gas and patterned into an insulating film pattern 8b. Next, an insulating film of $SiO_2$ is deposited covering the entire surface by, for example, CVD. The thickness of the insulating film specified to thicker than a combined thickness of the gate wires and the polycrystalline Si film (for example, 800 nm). The insulating film is then polished down to a predetermined thickness by CMP. For example, about 400 nm of the insulating film is polished and hence removed to produce an interlayer insulating film 7b with a flat surface. Surface steps remaining after the planarization can be made 100 nm or less.

(5) The interlayer insulating film 7b and the gate insulating film 17 are partly etched away where specified to form contact holes 11a. Next, a TiW film (150 nm), an Al film (400 nm), and a TiW film (100 nm) are sequentially deposited covering the entire surface and patterned into a lead electrode pattern 10 and a signal wire pattern 20.

(6) An insulating film of $SiO_2$ is deposited covering the entire surface by, for example, plasma CVD using TEOS as a source gas. The thickness of the insulating film is specified substantially equal to that of the signal wire pattern 20 (for example, 650 nm). The insulating film is then patterned into an insulating film pattern 8a. Next, an insulating film is deposited covering the entire surface by, for example, CVD. The thickness of the insulating film is specified thicker than the signal wire pattern 20 (for example, 800 nm). The insulating film is then polished down to a predetermined thickness by CMP. For example, about 500 nm of the insulating film is polished and hence removed to produce an interlayer insulating film 7a with a flat surface. Surface steps remaining after the planarization can be made 100 nm or less.

(7) The interlayer insulating film 7a is partly etched away where specified to form contact holes 11b. Next, an ITO film of, for example, a 100-nm thickness is deposited covering the entire surface and patterned into patterned pixel electrodes 6.

Figure 9:
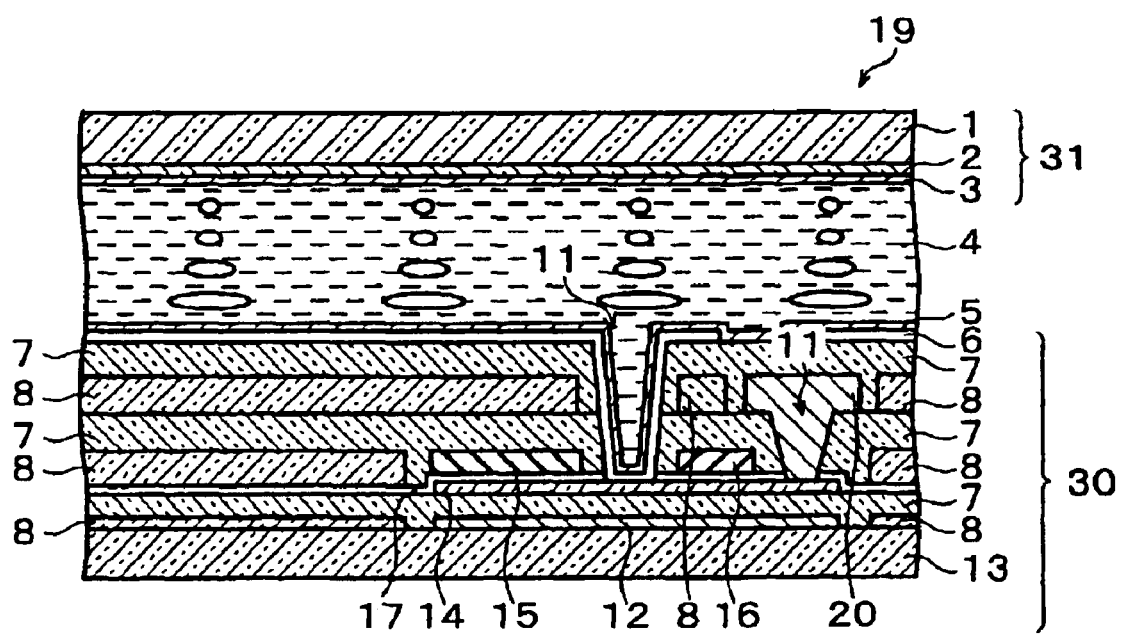
FIG. 9, illustrating an application example of the liquid crystal display in FIG. 8, is a cross-sectional view showing a liquid crystal display having a structure in which each pixel electrode is connected directly to the drain region of a TFT.

The liquid crystal display shown in FIG. 9 is an application example of the liquid crystal display in FIG. 8 and has a structure connecting the patterned pixel electrodes 6 directly to the drain regions of the TFTs.

EXAMPLE 4

Figure 10:
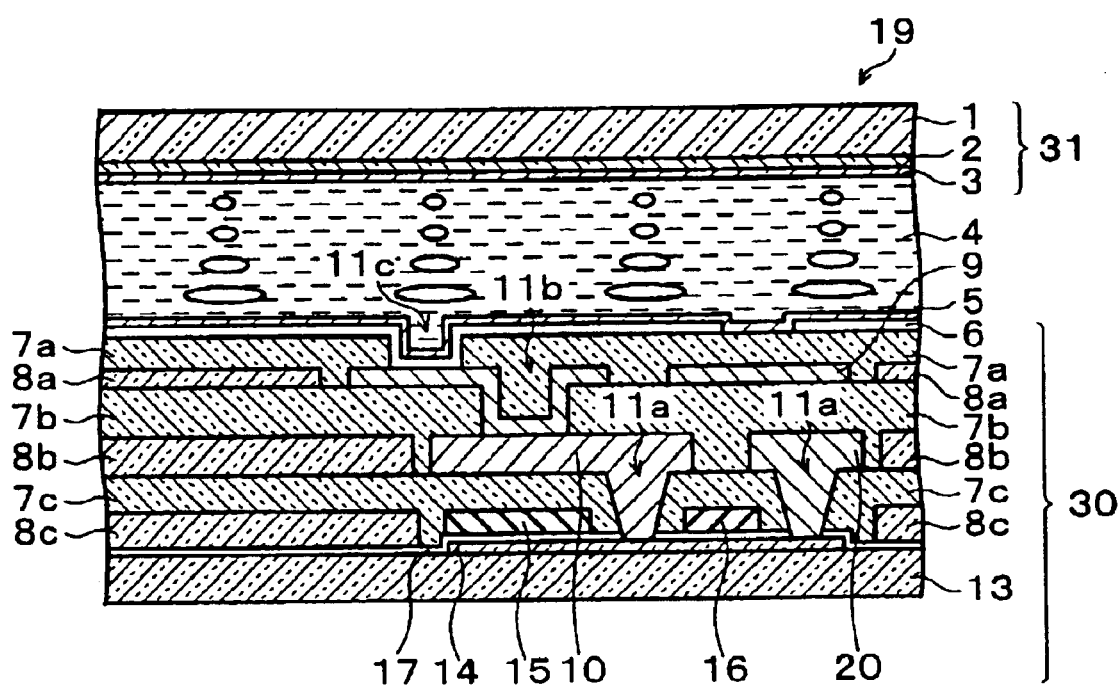
FIG. 10, illustrating a liquid crystal display which is an example of the present invention, is a cross-sectional view showing a liquid crystal display in which thin film transistors, additional capacitances, and transparent pixel electrodes are provided at intersections where gate wires and signal wires cross at right angles, the signal lines being topped by a second light-shield film with an interlayer insulating film intervening there between, all interlayer insulating films having an insulating film pattern and being planarized by CMP.

FIG. 10 shows an example case of a liquid crystal display including: thin film transistors, additional capacitances, and transparent pixel electrodes provided at intersections of gate wires and signal wires crossing each other at right angles; and a second light-shield film on top of the signal lines with an interlayer insulating film intervening there between, wherein each interlayer insulating film has an insulating film pattern and is planarized by CMP.

If any one of the interlayer insulating films has no insulating film pattern in relation to manufacturing cost and productivity, that interlayer insulating film may be subjected to a conventional method, such as simple CVD whereby an insulating film is deposited.

(1) A film (50 nm) of polycrystalline Si is deposited covering the entire surface of the insulating substrate 13 which is a substrate by, for example, CVD and patterned into a polycrystalline Si film 14. Next, a gate insulating film 17 (80 nm) of $SiO_2$ is deposited by, for example, CVD. A film (150 nm) of P-doped polycrystalline Si and a WSi film (150 nm) are then sequentially deposited covering the entire surface and patterned into gate wires 16 and auxiliary capacitance electrodes 15 for additional capacitance elements.

(2) An insulating film of $SiO_2$ is deposited covering the entire surface by, for example, plasma CVD using TEOS as a source gas. The thickness of the insulating film is specified substantially equal to a combined thickness of the gate wires and the polycrystalline Si film (for example, 350 nm). The insulating film is then patterned into an insulating film pattern 8c. Next, an insulating film of $SiO_2$ is deposited covering the entire surface by, for example, CVD. The thickness of the insulating film is specified thicker than a combined thickness of the gate wires 16 and the polycrystalline Si film 14 (for example, 800 nm). Next, the insulating film is polished down to a predetermined thickness by CMP. For example, about 400 nm of the insulating film is polished and hence removed to produce an interlayer insulating film 7c with a flat surface. Surface steps remaining after the planarization can be made 100 nm or less.

(3) The interlayer insulating film 7c and the gate insulating film 17 are partly etched away where specified to form contact holes 11a. Next, a TiW film (150 nm), an Al film (400 nm), and a TiW film (100 nm) are sequentially deposited covering the entire surface and patterned into a lead electrode pattern 10 and a signal wire pattern 20.

(4) An insulating film of $SiO_2$ is deposited covering the entire surface by, for example, plasma CVD using TEOS as a source gas. The thickness of the insulating film is specified substantially equal to that of the signal wire pattern 20 (for example, 650 nm). The insulating film is then patterned into an insulating film pattern 8b. Next, an insulating film is deposited covering the entire surface by, for example, CVD. The thickness of the insulating film is specified thicker than the signal wires (for example, 800 nm). The insulating film is then polished down to a predetermined thickness by CMP. For example, about 500 nm of the insulating film is polished and hence removed to produce an interlayer insulating film 7b with a flat surface. Surface steps remaining after the planarization can be made 100 nm or less.

(5) The interlayer insulating film 7b is partly etched away where specified to form contact holes 11b. Next, a TiW film (125 nm) is deposited covering the entire surface by, for example, vapor deposition or sputtering and patterned into an electrically conductive, second light-shield film pattern 9.

(6) An insulating film of $SiO_2$ is deposited covering the entire surface up to a thickness substantially equal to that of the second light-shield film pattern 9 (for example, 125 nm) by, for example, plasma CVD using TEOS as a source gas and patterned into an insulating film pattern 8a. Next, an insulating film is deposited covering the entire surface by, for example, CVD. The thickness of the insulating film is specified thicker than the signal wire pattern 20 (for example, 500 nm). The insulating film is then polished down to a predetermined thickness by CMP. For example, about 200 nm of the insulating film is polished and hence removed to produce an interlayer insulating film 7a with a flat surface. Surface steps remaining after the planarization can be made 50 nm or less.

(7) The interlayer insulating film 7a is partly etched away where specified to form contact holes 11c. Next, an ITO film of, for example, a 100-nm thickness is deposited covering the entire surface and patterned into patterned pixel electrodes 6.

Figure 11:
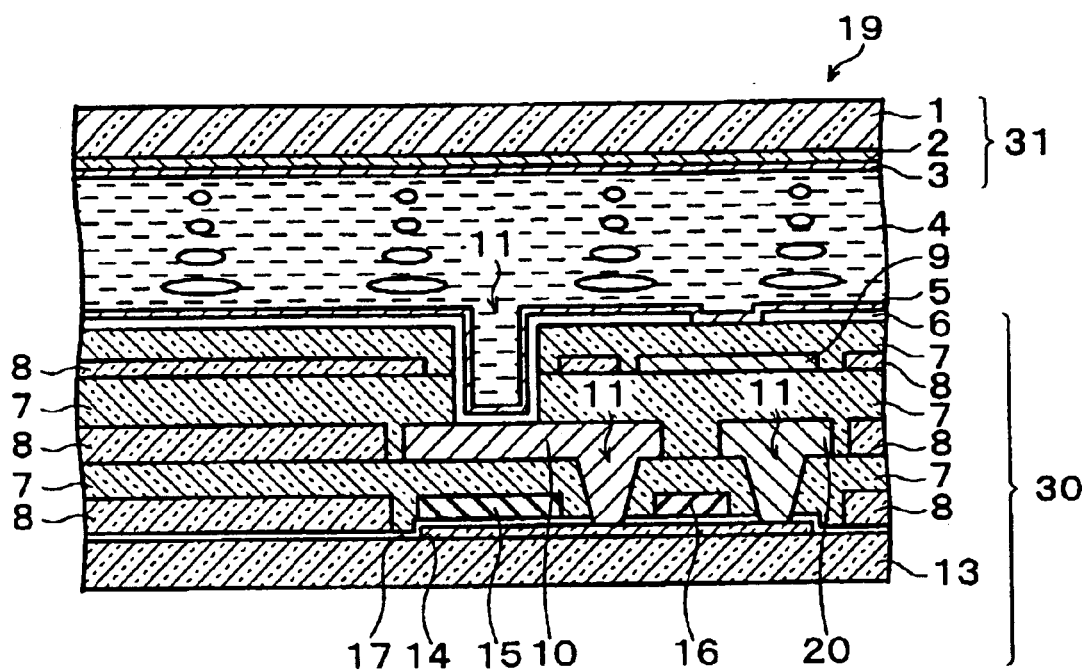
FIG. 11, illustrating an application example of the liquid crystal display in FIG. 10, is a cross-sectional view showing a liquid crystal display having a structure in which each pixel electrode is connected to the drain region of a TFT via a metal (the same layer as the signal lines).
Figure 12:
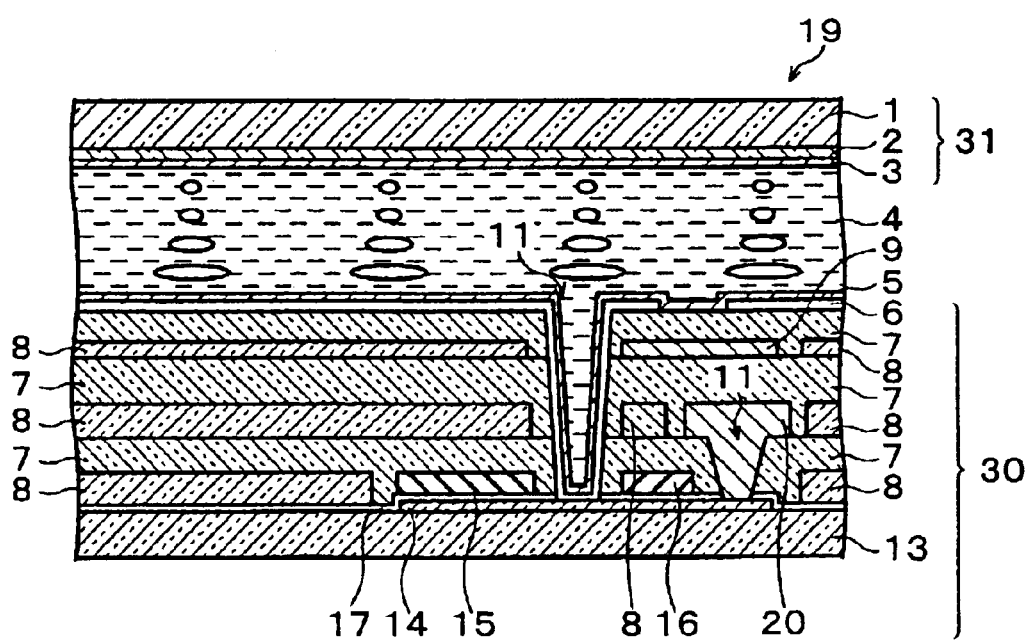
FIG. 12, illustrating an application example of the liquid crystal display in FIG. 10, a cross-sectional view showing a liquid crystal display having a structure in which each pixel electrode is connected directly to the drain region of a TFT.
Figure 13:
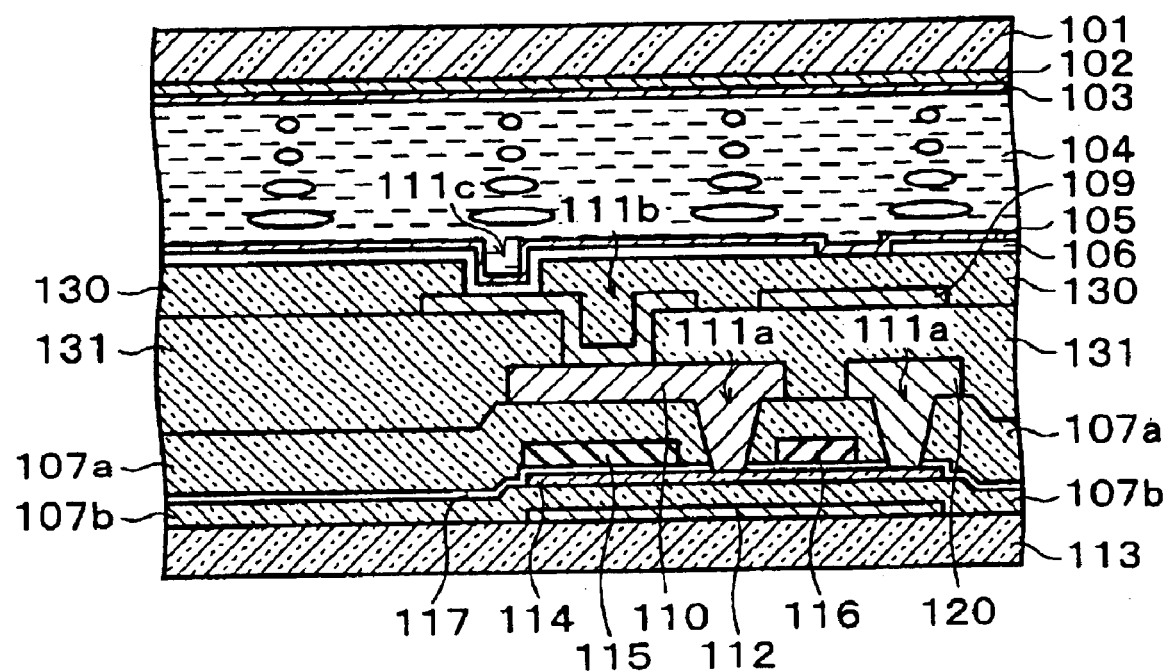
FIG. 13 is a cross-sectional view of a conventional liquid crystal display.

The liquid crystal displays in FIGS. 11, 12 are application examples of the liquid crystal display in FIG. 10. FIG. 11 shows a structure connecting the patterned pixel electrodes 6 to the drain regions of the TFTs via metal (the same layer as the signal lines). FIG. 12 shows a structure connecting the patterned pixel electrodes 6 directly to the drain regions of the TFTs.

The above is an explanation of transparent liquid crystal displays by way of embodiments and examples. However, the present invention is not limited to substrates for transparent liquid crystal displays, but is applicable to, for example, substrates for reflective liquid crystal displays.

The embodiments and examples described in DESCRIPTION OF THE EMBODIMENTS are for illustrative purposes only and by no means limit the scope of the present invention. Variations are not to be regarded as a departure from the spirit and scope of the invention, and all such modifications as would be obvious to one skilled in the art are intended to be included within the scope of the claims below.

What is claimed is:

1. A substrate with a planarization film provided thereon to fill up irregularities caused by a pattern on the substrate, comprising
an electrically insulating dummy pattern for planarization formed between convex portions on the substrate so as to be separated by a predetermined distance from the convex portions, the planarization film being formed to fill up gaps between the dummy pattern and the convex portions.

2. The substrate with a planarization film as set forth in claim 1, wherein the substrate is used in a display.

3. The substrate with a planarization film as set forth in claim 1, wherein the substrate is used in a liquid crystal display.

4. A substrate with a planarization film provided thereon to fill up irregularities caused by a pattern on the substrate, comprising
a dummy pattern for planarization formed between convex portions on the substrate so as to be separated by a predetermined distance from the convex portions, the planarization film being formed to fill up gaps between the dummy pattern and the convex portions; and
wherein the dummy pattern is made of layers comprising silicon dioxide films, silicon nitride films, or a combination of at least one silicon dioxide film and at least one silicon nitride film.

5. A method of manufacturing a substrate with a planarization film provided thereon to fill up irregularities caused by a pattern on a surface of the substrate, the method comprising:
forming an electrically insulating dummy pattern for planarization between convex portions on the surface of the substrate, so that the dummy pattern is separated by a predetermined distance from the convex portions, before forming the planarization film to fill up the irregularities caused by the pattern on the surface of the substrate; and
forming the planarization film to fill up gaps between the dummy pattern and the convex portions.

6. The method of manufacturing a substrate with a planarization film as set forth in claim 5, wherein the substrate is used in a display.

7. The method of manufacturing a substrate with a planarization film as set forth in claim 5, wherein the substrate is used in a liquid crystal display.

8. A method of manufacturing a substrate with a planarization film provided thereon to fill up irregularities caused by a pattern on a surface of the substrate, the method comprising:
forming a dummy pattern for planarization between convex portions on the surface of the substrate, so that the dummy pattern is separated by a predetermined distance from the convex portions, before forming the planarization film to fill up the irregularities caused by the pattern on the surface of the substrate;
forming the planarization film to fill up saps between the dummy pattern and the convex portions; and
wherein the dummy pattern is made of layers constituted by silicon dioxide films, silicon nitride films, or a combination of at least one silicon dioxide film and at least one silicon nitride film.

9. The method of manufacturing a substrate with a planarization film as set forth in claim 5, wherein a film formed to fill up the gaps between the dummy pattern and the convex portions is planarized by CMP to form the planarization film.

10. A display substrate including pixel electrodes thereon, with a planarization film intervening there between to fill up irregularities caused by a pattern on an underlying surface for the pixel electrodes, comprising
an electrically insulating dummy pattern for planarization provided between convex portions on a surface on which the planarization film is formed and also on which the irregularities caused by the pattern exist, so that the dummy pattern is separated by a predetermined distance from the convex portions, the planarization film being formed to fill up gaps between the dummy pattern and the convex portions.

11. The display substrate as set forth in claim 10, wherein the substrate is used in a liquid crystal display.

12. A display substrate including pixel electrodes thereon, with a planarization film intervening there between to fill up irregularities caused by a pattern on an underlying surface for the pixel electrodes, comprising
 a dummy pattern for planarization provided between convex portions on a surface on which the planarization film is formed and also on which the irregularities caused by the pattern exist, so that the dummy pattern is separated by a predetermined distance from the convex portions, the planarization film being formed to fill up gaps between the dummy pattern and the convex portions; and
 wherein the dummy pattern is made of layers constituted by silicon dioxide films, silicon nitride films, or a combination of at least one silicon dioxide film and at least one silicon nitride film.

13. A method of manufacturing a display substrate including pixel electrodes thereon, with a planarization film intervening there between to fill up irregularities caused by a pattern on an underlying surface for the pixel electrodes, the method comprising:
 forming an electrically insulating dummy pattern for planarization between convex portions on a surface on which the planarization film is formed and also on which the irregularities caused by the pattern exist, so that the dummy pattern is separated by a predetermined distance from the convex portions, before forming the planarization film to fill up the irregularities caused by the pattern on an underlying surface for the pixel electrodes; and
 forming the planarization film to fill up gaps between the dummy pattern and the convex portions.

14. The method of manufacturing a display substrate as set forth in claim 13, wherein the substrate is used in a liquid crystal display.

15. A method of manufacturing a display substrate including pixel electrodes thereon, with a planarization film intervening there between to fill up irregularities caused by a pattern on an underlying surface for the pixel electrodes, the method comprising:
 forming a dummy pattern for planarization between convex portions on a surface on which the planarization film is formed and also on which the irregularities caused by the pattern exist, so that the dummy pattern is separated by a predetermined distance from the convex portions, before forming the planarization film to fill up the irregularities caused by the pattern on an underlying surface for the pixel electrodes;
 forming the planarization film to fill up gaps between the dummy pattern and the convex portions; and
 wherein the dummy pattern is made of layers comprising silicon dioxide films, silicon nitride films, or a combination of at least one silicon dioxide film and at least one silicon nitride film.

16. The method of manufacturing a display substrate as set forth in claim 13, wherein a film formed to fill up the gaps between the dummy pattern and the convex portions is planarized by CMP to form the planarization film.

17. A display substrate including: active elements provided on the substrate to control writing of a signal to pixel electrodes; and a light-shield film provided on the active elements to shield the active elements from light, with a planarization film intervening there between so as to fill up irregularities caused by a pattern on an underlying surface for the light-shield film, comprising
 an electrically insulating dummy pattern for planarization between convex portions on a surface on which the planarization film is formed and also on which the irregularities caused by the pattern exist, so that the dummy pattern is separated by a predetermined distance from the convex portions, the planarization film being formed to fill up gaps between the dummy pattern and the convex portions.

18. The display substrate as set forth in claim 17, wherein the substrate is used in a liquid crystal display.

19. The display substrate as set forth in claim 17, wherein the active elements are thin film transistors (TFTs).

20. A display substrate including: active elements provided on the substrate to control writing of a signal to pixel electrodes; and a light-shield film provided on the active elements to shield the active elements from light, with a planarization film intervening there between so as to fill up irregularities caused by a pattern on an underlying surface for the light-shield film, comprising
 a dummy pattern for planarization between convex portions on a surface on which the planarization film is formed and also on which the irregularities caused by the pattern exist, so that the dummy pattern is separated by a predetermined distance from the convex portions, the planarization film being formed to fill up gaps between the dummy pattern and the convex portions; and
 wherein the dummy pattern is made of layers constituted by silicon dioxide films, silicon nitride films, or a combination of at least one silicon dioxide film and at least one silicon nitride film.

21. A method of manufacturing a display substrate including: active elements provided on the substrate to control writing of a signal to pixel electrodes; and a light-shield film provided on the active elements to shield the active elements from light, with a planarization film intervening there between so as to fill up irregularities caused by a pattern on an underlying surface for the light-shield film, the method comprising:
 forming an electrically insulating dummy pattern for planarization between convex portions of the pattern, so that the dummy pattern is separated by a predetermined distance from the convex portions, before forming the planarization film to fill up the irregularities caused by the pattern; and
 forming the planarization film to fill up gaps between the dummy pattern and the convex portions.

22. The method of manufacturing a display substrate as set forth in claim 21, wherein the substrate is used in a liquid crystal display.

23. The method of manufacturing a display substrate as set forth in claim 21, wherein the active elements are thin film transistors (TFTs).

24. A method of manufacturing a display substrate including: active elements provided on the substrate to control writing of a signal to pixel electrodes; and a light-shield film provided on the active elements to shield the active elements from light, with a planarization film intervening there between so as to fill up irregularities caused by a pattern on an underlying surface for the light-shield film, the method comprising:
 forming a dummy pattern for planarization between convex portions of the pattern, so that the dummy pattern is separated by a predetermined distance from the convex portions, before forming the planarization film to fill up the irregularities caused by the pattern;

forming the planarization film to fill up gaps between the dummy pattern and the convex portions; and wherein the dummy pattern is made of layers constituted by silicon dioxide films, silicon nitride films, or a combination of at least one silicon dioxide film and at least one silicon nitride film.

25. The method of manufacturing a display substrate as set forth in claim 21, wherein a film formed to fill up the gaps between the dummy pattern and the convex portions is planarized by CMP to form the planarization film.

26. A display substrate including: active elements provided on the substrate to control writing of a signal to pixel electrodes; patterned layers including wires driving the active elements; and interlayer insulating films provided as layers so as to separate the patterned layers from each other, the substrate comprising:

an electrically insulating dummy pattern for planarization provided on at least one of surfaces on which the interlayer insulating films are formed, between convex portions of irregularities caused by an associated one of the patterned layers, so that the dummy pattern is separated by a predetermined distance from the convex portions; and an interlayer insulating film, with a planarized surface, filling up gaps between the dummy pattern and the convex portions.

27. The display substrate as set forth in claim 26, wherein the substrate is used in a liquid crystal display.

28. The display substrate as set forth in claim 26, wherein the active elements are thin film transistors (TFTs).

29. A display substrate including: active elements provided on the substrate to control writing of a signal to pixel electrodes; patterned layers including wires driving the active elements; and interlayer insulating films provided as layers so as to separate the patterned layers from each other, the substrate comprising:

a dummy pattern for planarization provided on at least one of surfaces on which the interlayer insulating films are formed, between convex portions of irregularities caused by an associated one of the patterned layers, so that the dummy pattern is separated by a predetermined distance from the convex portions;

an interlayer insulating film, with a planarized surface, filling up gaps between the dummy pattern and the convex portions; and wherein the dummy pattern is made of layers constituted by silicon dioxide films, silicon nitride films, or a combination of at least one silicon dioxide film and at least one silicon nitride film.

30. A method of manufacturing a display substrate including: active elements provided on the substrate to control writing of a signal to pixel electrodes; patterned layers including wires driving the active elements; and interlayer insulating films provided as layers so as to separate the patterned layers from each other, the method comprising:

(a) forming an electrically insulating dummy pattern for planarization on at least one of surfaces on which the interlayer insulating films are formed, between convex portions of irregularities caused by an associated one of the patterned layers, so that the dummy pattern is separated by a predetermined distance from the convex portions;

(b) forming an interlayer insulating film so as to fill up gaps between the dummy pattern and the convex portions; and (c) planarizing a surface of an interlayer insulating film.

31. The method of manufacturing a display substrate as set forth in claim 30, wherein the substrate is used in a liquid crystal display.

32. The method of manufacturing a display substrate as set forth in claim 30, wherein the active elements are thin film transistors (TFTs).

33. A method of manufacturing a display substrate including: active elements provided on the substrate to control writing of a signal to pixel electrodes; patterned layers including wires driving the active elements; and interlayer insulating films provided as layers so as to separate the patterned layers from each other, the method comprising:

(a) forming a dummy pattern for planarization on at least one of surfaces on which the interlayer insulating films are formed, between convex portions of irregularities caused by an associated one of the patterned layers, so that the dummy pattern is separated by a predetermined distance from the convex portions;

(b) forming an interlayer insulating film so as to fill up gaps between the dummy pattern and the convex portions;

(c) planarizing a surface of an interlayer insulating film; and wherein the dummy pattern is made of layers constituted by silicon dioxide films, silicon nitride films, or a combination of at least one silicon dioxide film and at least one silicon nitride film.

34. The method of manufacturing a display substrate as set forth in claim 30, wherein in step (c), the surface of the interlayer insulating film is planarized by CMP.

35. The substrate of claim 1, wherein at least one additional dummy pattern is formed between the substrate and said electrically insulating dummy pattern.

36. The substrate of claim 1, wherein the substrate is a glass substrate in a liquid crystal display (LCD), and wherein the convex portions comprise source and/or drain electrodes of a transistor of the LCD.

37. The substrate of claim 1, wherein the substrate is a glass substrate in a liquid crystal display (LCD), and wherein the convex portions comprise electrode(s) electrically connected to source and/or drain electrodes of a transistor of the LCD.

38. A liquid crystal display comprising:

first and second substrates with a liquid crystal layer provided therebetween;

a planarization film provided on the first substrate to fill in irregularities caused by a pattern including convex portions provided on the first substrate;

an electrically insulating dummy pattern for planarization formed between the convex portions so as to be spaced apart from the convex portions, the planarization film being formed to fill in gaps between the dummy pattern and the convex portions.

39. The display of claim 38, wherein at least one additional dummy pattern is formed between the first substrate and said electrically insulating dummy pattern.

40. The display of claim 38, wherein the convex portions comprise source and/or drain electrodes of a transistor of the display.

41. The display of claim 38, wherein the first substrate is a glass substrate, and wherein the convex portions comprise electrode(s) electrically connected to source and/or drain electrodes of a transistor of the display.

42. The display of claim 38, wherein the dummy pattern comprises silicon dioxide and/or silicon nitride.

43. The display of claim 38, wherein the dummy pattern is substantially transparent.

* * * * *